United States Patent
Witchey et al.

(10) Patent No.: US 11,020,668 B2
(45) Date of Patent: *Jun. 1, 2021

(54) DISTRIBUTED LEDGER TRACKING OF EVENT DATA

(71) Applicant: Nant Holdings IP, LLC, Culver City, CA (US)

(72) Inventors: Nicholas J. Witchey, Laguna Hills, CA (US); John Wiacek, Los Angeles, CA (US); Patrick Soon-Shiong, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/031,760

(22) Filed: Sep. 24, 2020

(65) Prior Publication Data

US 2021/0016178 A1 Jan. 21, 2021

Related U.S. Application Data

(63) Continuation of application No. 16/687,592, filed on Nov. 18, 2019, now Pat. No. 10,835,825.

(Continued)

(51) Int. Cl.
*A63F 13/70* (2014.01)
*G06F 16/23* (2019.01)
*G06F 16/27* (2019.01)

(52) U.S. Cl.
CPC .......... *A63F 13/70* (2014.09); *G06F 16/2379* (2019.01); *G06F 16/27* (2019.01)

(58) Field of Classification Search
USPC .......................................................... 463/25
See application file for complete search history.

(56) References Cited

U.S. PATENT DOCUMENTS

| 9,547,675 B2 | 1/2017 | Bostock |
| 9,716,723 B2 | 7/2017 | Wittenschlaeger |

(Continued)

FOREIGN PATENT DOCUMENTS

| KR | 10-1870113 B1 | 6/2018 |
| WO | 2018/129118 A1 | 7/2018 |

OTHER PUBLICATIONS

International Search Report and Written Opinion issued International Application No. PCT/US2019/062068 dated May 11, 2020, 12 pages.

*Primary Examiner* — Pierre E Elisca
(74) *Attorney, Agent, or Firm* — Mauriel Kapouytian Woods LLP; Liang Huang; Andrew Noble

(57) ABSTRACT

Techniques including data collection, organization and usage are provided, including in connection with computer-based gaming. Methods and systems are provided for establishing a set of data chronicling at least a portion of a duration of a computer-based gaming event that includes at least one user engaging in gaming using a computer or a computer-based device. Event data is obtained for chronicling chronologically ordered in-game events. Hardware and software related data is obtained that relates to the computer or the computer-based device and is relevant to the chronicling of the portion of the gaming event. Utilizing a distributed ledger technology or blockchain, the event data and the hardware and software related data are recorded in establishing the set of data chronicling at least a portion of the duration of the gaming event.

20 Claims, 10 Drawing Sheets

Related U.S. Application Data

(60) Provisional application No. 62/769,212, filed on Nov. 19, 2018.

(56) References Cited

U.S. PATENT DOCUMENTS

| | | |
|---|---|---|
| 9,886,625 B2 | 2/2018 | Wnuk et al. |
| 9,928,290 B2 | 3/2018 | Tiell |
| 10,050,959 B2 | 8/2018 | Soon-Shiong et al. |
| 10,216,984 B2 | 2/2019 | Wnuk et al. |
| 10,340,038 B2 | 7/2019 | Witchey |
| 10,491,467 B2 | 11/2019 | Wittenschlaeger et al. |
| 10,572,724 B2 | 2/2020 | Wnuk et al. |
| 10,835,825 B2 | 11/2020 | Witchey et al. |
| 2005/0043097 A1* | 2/2005 | March ............... A63F 13/47 463/42 |
| 2008/0153600 A1* | 6/2008 | Swarna ............ G06F 11/3409 463/43 |
| 2014/0187334 A1* | 7/2014 | Crossley ............ A63F 13/44 463/43 |
| 2018/0018590 A1 | 1/2018 | Szeto et al. |
| 2018/0082043 A1 | 3/2018 | Witchey et al. |
| 2018/0082287 A1 | 3/2018 | Sheerin |
| 2018/0096752 A1 | 4/2018 | Ovalle |
| 2018/0117447 A1 | 5/2018 | Tran et al. |
| 2018/0158162 A1 | 6/2018 | Ramasamy |
| 2018/0293834 A1 | 10/2018 | Cage et al. |
| 2019/0272710 A1* | 9/2019 | Maggio ............ G07F 17/3223 |

* cited by examiner

DISTRIBUTED LEDGER TRACKING OF EVENT DATA

CROSS-REFERENCE TO RELATED APPLICATION

This application is a continuation of U.S. application Ser. No. 16/687,592, filed on Nov. 18, 2019 which claims the benefit of to U.S. Provisional Application Ser. No. 62/769,212, filed on Nov. 19, 2018, entitled "DISTRIBUTED LEDGER TRACKING OF EVENT DATA," the contents of which are incorporated by reference in their entirety for all purposes.

BACKGROUND

This disclosure relates to use of ledger data structure technologies (e.g., distributed ledgers, blockchain, graphs, etc.) in connection with computer-based gaming and physical games.

Development and use of ledger-based data structures such as blockchains and distributed ledger technologies are on the rise. A distributed ledger typically includes a consensus of replicated, shared, and synchronized digital data across multiple computing nodes. The multiple computing nodes may be located in one or more geographically different sites or locations. Consensus is generally achieved over a distributed peer-to-peer network based on some form of a "proof" algorithm, for example, a proof-of-work or a proof-of-stake algorithm.

Particularly in a world of ever-increasing digitization and connectivity, distributed ledger technologies can offer great advantages in providing very efficient, secure, immutable, tamper-resistant, or tamper-proof records that do not require centralized generation of the records. Further, distributed ledger technologies are not subject to the risks and disadvantages of such centralization. One type of distributed ledger technology is the blockchain, as used, for example, by Bitcoin, which provides a cryptocurrency and worldwide payment system. As described above, distributed ledgers are distributed among peers or multiple computing nodes. Thus, distributed ledgers in the form of a blockchain are distributed among peers or multiple computing nodes. In addition to a distributed blockchain, a blockchain can also be centralized or semi-centralized. In other embodiments, distributed ledgers can use various other types of data structures including directed acyclic graph (DAG) technologies, hash graphs, tangles, or other types of linked data structures. Distributed ledgers can be public, private, or a combination of both. The public or private nature of such ledgers may have an impact on which computing nodes or peers are able to participate in management of the corresponding data structures.

While often associated with financial transaction records, ledger data structures (e.g., blockchain, DAG, or hashgraph technologies) are useful in a wide array of other areas beyond financial transactions. Furthermore, ledger data structures can be useful not only with transactional data, but also with non-transactional records including, for example, healthcare data records.

Particularly, blockchain technology has been recently used for "smart contracts". Generally, a smart contract may use blockchain technology to allow contract-based exchanges without the usual intermediaries. For example, U.S. Patent Application Publication Number 20180158162, entitled "System and Method for Microshare Based Content Funding and Distribution," discusses the use of blockchain-based smart contract type technology in assigning digital property rights to digital media.

As another example, U.S. Patent Application Publication Number 20180096752, entitled "System for Multiple Legal Game Providers with Digital Ledger," discusses using distributed ledger and blockchain technologies to administer lotteries. A distributed ledger-based platform is discussed for the use of lottery game providers in administering regional or multijurisdictional lotteries and for storing lottery transaction data.

Additionally, U.S. Patent Application Publication Number 20180082287, entitled "Cryptocurrency Lock for Online Accounts", discusses the use of blockchain technology in connection with secure account access, such as gaming account access.

Furthermore, U.S. Pat. No. 9,928,290, entitled "Trust Framework for Platform Data", discusses the use of blockchain technology in data tracking in connection with providing a super-platform for data collection and management, with data collected and aggregated from multiple individual platforms. Applications discussed within this framework include networked and streaming gaming.

Although ledger data structures such as blockchains and distributed ledger technologies are on the rise, such technologies have not been leveraged for validation or notarization of event data. Event data can include, for example, data related to eSporting events, physical sporting events, physical or video gaming events, or the like. In one example, eSporting (e.g., video games as a sporting event) is on the rise both as a spectator professional sport as well as an on-line gaming event among amateurs. As a rising trend, eSporting is expected to become a billion-dollar industry in the very near future. However, in eSporting events or other types of gaming events, cheating or data tampering in both professional events and amateur events continues to be an issue. Therefore, technologies that offer the ability to validate a gaming event or identify cheaters, cheating behavior, or data tampering are desired to ensure the continued integrity of the market. Thus, there continues to be a need for ledger-type technologies that can provide pre-event, real-time, during an event, or even post-event notarization or validation services.

SUMMARY

Some embodiments of the disclosed subject matter relate generally to ledger data structure technologies, distributed ledgers for example, in connection with computer-based gaming, eSports, fantasy sports, electronic gaming, physical games, or other computer trackable events.

In some embodiments, event data is obtained. The event data can be associated with gaming events such as in-game events occurring during at least a portion of a specified time duration of a gaming event. The event data associated with the time duration can be aggregated as a data block or gaming data unit and can be stored within a ledger data structure. Event data associated with gaming events can be diverse and can include various levels of details. The diversity and levels of details may differ greatly depending on the nature of the game's genre, game's engine, underlying technology, or other factors. In some embodiments, the event data associated with gaming events can be delivered in a data stream. The data stream can be received in a substantially continuous manner (e.g., TCP data steams, etc.), as blocks of data (e.g., UDP datagrams, etc.), or other forms of data delivery.

Event data is one type of game associated data. In some embodiments, other game associated data can be obtained in addition to obtaining the event data. The other game associated data can include, without limitation, data related to hardware, software, video streaming software (e.g., Twitch.TV, Smashcast.TV, etc.), video of the player playing (e.g., Twitch.TV, Smashcast.TV, etc.), internal gaming data, external sensor data outside of the game itself (e.g., web cams, microphones, etc.), other software running on a gaming computer, key or other input logging data, voice data, networking, game settings, game performance, server setting, server status, player latency, server latency, network latency, player skins, weapon skins, gear skins, other skins, in-game chats, spectator chats, player physical movement (for virtual reality, augmented reality and mixed reality games), in-game features, gamers, metadata, metagaming features, gaming circumstances, game and system logs, game environment data, or other data modalities associated with one or more electronic games.

In some embodiments, based on the obtained game associated data (e.g., the event data associated with in-game events and hardware and software related data), ledger data structure technology can be utilized to facilitate establishing a set of data chronicling or notarizing at least a portion of the duration of the gaming event. In some embodiments, the set of data can be configured for, useable for, provided for, or used for various uses. For example, the set of data can be used for game, gaming, spectator, league, team, fantasy league, and gamer related uses; game related data determination and verification uses; fair play, anti-cheating and cheating detection uses; statistical, data collection and data mining uses; training game AIs; or any other uses by various parties or entities.

In some embodiments, the game associated data can include, for example, hardware specifications, hardware configurations, software, software settings, network, network configuration data, environment data, social media data, or other types of data or data modalities. Furthermore, it can include data associated with the game, pre-game events, in-game events, or even post-game events. It can also include data associated with the spectators, one or more gamers, physical interaction(s), and/or physical proximity between players, one or more players and one or more spectators or some combination thereof. The game associated data can also include data associated with the gamer's in-game actions and interactions, and/or pre- or post-game interactions with other gamers. It can further include the gamer's external actions in connection with the computer or device, or peripherals. It can also include data associated with the gamer's actions or conduct external to gameplay and the gaming device, such as conduct or status of the gamer derived from video, audio or other sensor-derived, sensed or externally captured data. Still further, it can include other data, such as data associated with the gaming environment and related circumstances, whether physical, virtual or conceptual. Such data can include, for example, data associated with the nature and configuration of the gaming area (e.g., an area that surrounds the gamer or is external to the gamer) and the gaming computer or device, among other types of data entirely.

Game associated data can include data associated with a gaming computer or device. Data associated with the gaming computer or device can include hardware and software stored on, run or executed on the gaming computer or device. It can further include data associated with hardware or software external to the gaming computer or device, such as hardware and software associated with the associated network, network configuration and networked devices, such as servers and gaming servers. It can include, for example, data associated with hardware and software stored, run or executed on the servers, which may be served to the gaming computer or device as a client, or operating partly or entirely as a client, or only transiently stored or not stored thereon, for example. Without limitation, any such data may herein be considered data associated with the gaming computer or device (e.g., desktop computers, laptop computers, mobile phones/smartphones, tablets, smart watch, handheld, game counsels, game cabinets, set top boxes, dedicated gaming devices, etc.).

Various other aspects of the disclosed subject matter will become more apparent from the following specification, along with the accompanying drawings in which like numerals represent like components.

Figure 1:
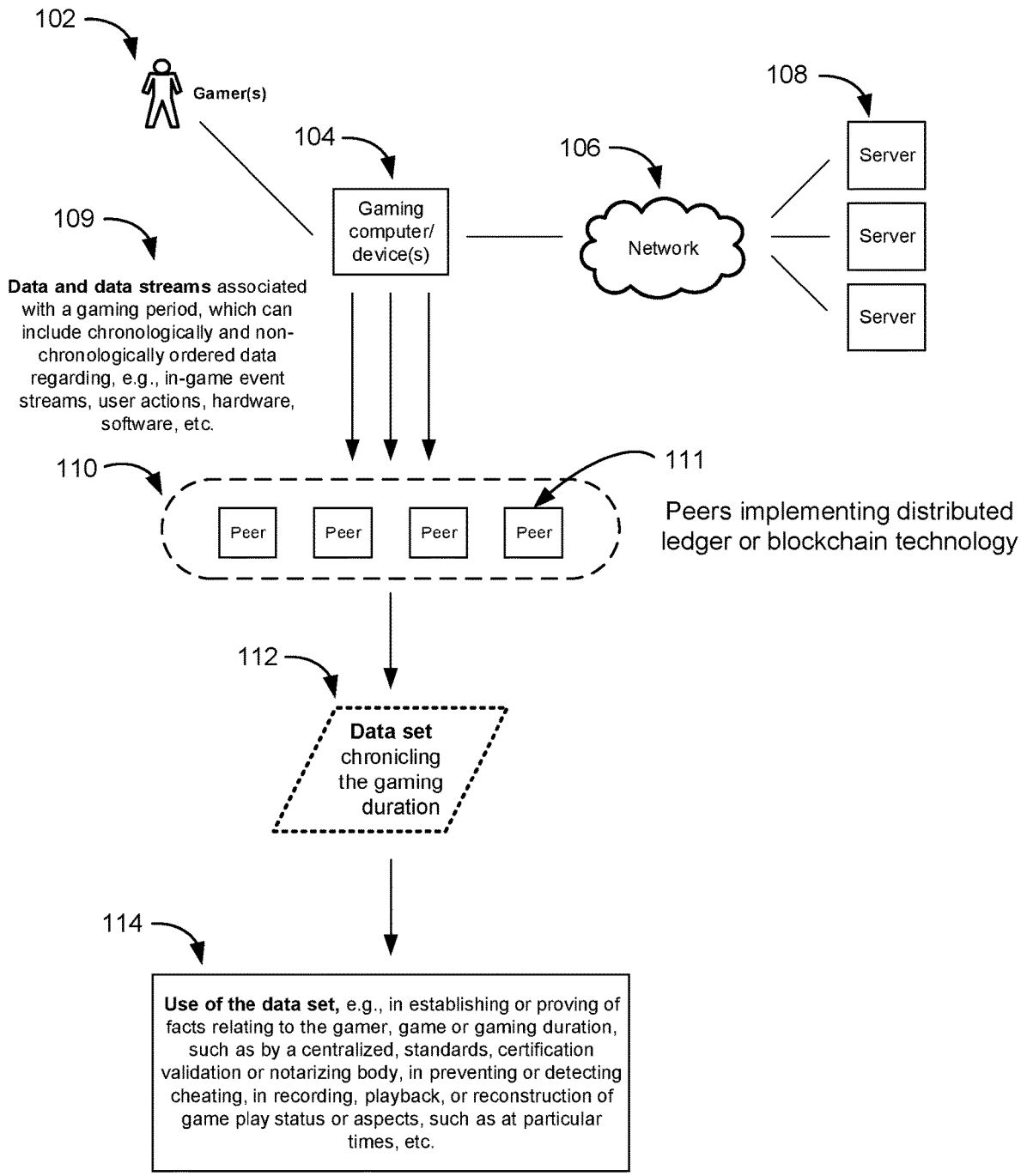
FIG. 1 illustrates a block diagram in accordance with an embodiment of the disclosed subject matter, including use of distributed ledger or blockchain technologies in establishing a data set chronicling a duration of a gaming event.

While the disclosed subject matter is described with reference to the above drawings, the drawings are intended to be illustrative, and other embodiments are consistent with the spirit, and within the scope, of the disclosed subject matter.

DETAILED DESCRIPTION

Herein, the terms "chronicling", "chronicle" and "chronicled" and the like are intended to be broadly construed, and to include or potentially include, for example, without limitation, providing a form of characterization, description, representation, notarization, reflection, or indication, etc. The provision of such a form can be partial, limited, selective, complete, direct, indirect, etc., or otherwise. The provision of such a form can be performed to whatever degree requiring interpretation, processing, translation or transformation, etc., which is or may be useable, configured to be useable, or intended to be useable, for uses described herein, among others.

Herein, the term "game" is intended to be broadly construed, including all genres and platforms, among other things, video games, computer games, electronic games, application-based games, training games, virtual reality games, mixed reality games, augmented reality games, fantasy sports, eSports, simulation games, pastimes, etc., as well as online gambling or betting games, casino related games, including slot machine type games, electronic poker games such as Texas Hold'em games, whether in-person or online, electronic lottery type games, massive multiplayer online games, other distributed or geographically distributed games, virtual reality simulations, simulated worlds, and others. Still further, the term "game" is also construed to include non-electronic or physical games. Example non-electronic or physical games can include card games (e.g., poker, Magic The Gathering®, etc.), sports including actual physical sports (e.g., football, baseball, curling, basketball, soccer, hockey, etc.), motorsports or eSport, board games (e.g., chess, Go, Settlers of Catan®, Warhammer 40K®, etc.), fantasy sports of all sorts, or other types of games. One should note that the disclosed technologies can be applied to non-electronic games through digital observations of the game being played; via cameras, RFID or microphones for example.

Herein, the term "gamer" is broadly intended to include, for example, players (e.g., athletes, coaches, drivers, jockeys, etc.), betters, gamblers, game participants and participant support personnel, spectators, commentators, etc. A gamer can be a human being, for example, a human player. A gamer can also be an artificial intelligence (AI) based entity. An AI-based entity can include, for example, one or more neural networks implementing machine learning or deep learning algorithms configured for game playing. The neural networks can be trained to play a game. For instance, an AI-based entity can be trained to play as an opponent to a human player in a chess or Go game. In some embodiments, a human player can generate or configure one or more AI-based entities to compete with one or more AI-based entities generated or configured by another human player. In some embodiments, in a game (e.g., a physical game), a human player can generate or configure two or more AI-based entities to compete with one another. The training data for training the AI-based entity can be collected, selected, aggregated, and/or annotated from the game associated data of past games played between human players or between human player(s) and AI-based entities. As another example, an AI-based entity can be trained to play as a teammate in an eSporting game.

Herein, terms such as "period", "duration" and the like are intended to be broadly construed and not intended to imply limitation, for example, to an entire occurrence, event, season, absolute time period, relative time period, etc. It should be appreciated that the concept of a period can represent a unit of time for which data can be packaged, aggregated, or assembled. The unit of time can be quite short (e.g., milliseconds or less) or quite long (e.g., minutes to hours to covering a complete event). Further, a time duration may follow a regular pattern (e.g., represent 10 seconds of game data) or an irregular pattern, possibly based on other non-temporal metrics.

Herein, the term "software" is intended to be broadly construed, including, for example, programs, applications, platforms, etc. represent computer or processor executable instructions stored in a tangible, non-transitory computer readable medium (e.g., RAM, Flash, SSD, hard drive, CD, DVD, Blueray®, ROM, etc.).

Herein, term "computer-based device" is intended to be broadly construed and to include devices with computer-related aspects, elements or components, even if such devices are not typically referred to as computers, including, for example, gaming consoles or devices, such as Xbox, PlayStation, Wii, Nintendo devices, Nintendo Switch, etc., mobile devices (Smartphones, tablets, etc.), smart watches, wearables, TVs (smart TV, Android TVs, etc.), TV boxes (Apple TV, Android TV boxes, Google Chromecast, etc.), gaming or game player stations, etc. Thus, a computer-based device is considered to include at least a memory facility (e.g., RAM, disk, SAN, NAS, etc.) and a processor facility (e.g., single processor, multicore processor, multiple processors, etc.) capable of executing instructions stored in the memory facility.

Herein, the term "data" is intended to represent a digital representation or digital encoding of information capable of being stored digitally in a computer memory. Data in general is considered to include "data streams" and vice versa. Furthermore, the term "data stream" is intended to be broadly construed, including, for example, flows of data, data over time, data transmitted, communicated, transferred, moved, or delivered over time, etc., over a network or computing bus and is not intended to be limited to any limited particular technical definition of the term "stream" or "data stream". Further, "data" is intended to cover digital information representing many different data type modalities or sensed modalities from sensors (e.g., cameras, microphones, temperature probes, etc.).

Herein, the terms "event" and "events" are intended to be broadly construed, such as to include actions, occurrences, happenings, developments, etc.

Herein, the term "technique" is intended to be broadly construed and to include implementable technologies.

Herein, the terms "game" and "gaming" are intended to be used interchangeably, inclusively of one another, and both refer to the gaming industry and game industry. Further, these terms can refer to video games, computer games, games of chance, gambling, non-computer-based games such as physical games, or other forms of games.

Herein, the terms "gameplay" and "game play" are intended to be used interchangeably, inclusively of one another, and both refer to the game play of a specific game instance and gameplay of a game or specific game genre or hybrid game genre.

It should be appreciated that the disclosed subject matter relates to ledger data structures. As used herein, the term "ledger data structures" is intended to convey the concept of units of digital data linked together to form a ledger of information. Examples of such data structures can include blockchains, hashgraphs, directed acyclic graphs (DAG), linked lists, or other forms of linked structures. Further, ledger data structures can be distributed among multiple computing nodes, can be centralized, or a combination of both. In more preferred embodiments, the ledger data structures further include a form of digital notarization as discussed further below.

Herein, the term "distributed ledger" is intended to be broadly construed as a form of ledger data structure that can be shared, in whole or in part, among multiple computing or storage nodes. Example distributed ledgers technologies that could be used with the disclosed subject matter include blockchains, smart contracts (e.g., Ethereum; see URL www.ethereum.com), Openchain technique (see URL www.openchain.org), IOTA related directed acyclic graph techniques (see URL www.iota.org), a hashgraph-utilizing technique (see URL www.hedera.com), a hash chain-utilizing technique, or a Markov chain-utilizing technique, or other ledger based data structure technologies. It may not be necessary to completely distribute all data in the ledger. In fact, for some cases, an event and its associated ledger data structure can be held on a locked-down system, and it may be sufficient to log data on a single computing system. This may be done to preserve space on servers or bandwidth on a network so as not to interfere with the real-time nature of an event.

The disclosed subject matter relates to tracking digital data associated with an event, an eSporting event for example. In some embodiments, gaming data flows from one or more computing devices involved with the event to a chronicling engine. The chronicling engine can package, aggregate, or assemble the gaming data for archiving or recording purposes. In some embodiments, in addition to recording the gaming data, the gaming data can be transformed into one or more gaming data units (e.g., a data block, a set of related actions, metadata, etc.), which are linked to one another to form a ledger data structure. For example, the gaming data can be transformed to blocks of data where each block represents actions taken by a game player within a specific period or duration, possibly a discrete unit of time. The blocks of data can then be linked to form a blockchain where each block carries a hash value determined as a function of the data in the current block and possibly as hash value of a previous block. Still further, a particular block in a blockchain can be notarized by including one or more external tokens into the particular block where the external tokens can correspond to hash values of externally-distributed ledgers or blocks (e.g., a current Bitcoin block or Ethereum block that is distributed external to the particular block). This approach of tracking digital data associated with the gaming event using a ledger data structure (e.g., a blockchain) can have many benefits and advantages. For example, an entire event can be recorded, notarized, and validated in real-time or post event as desired. Due to the notarization service, the entire event data can be considered more trustworthy. Further, the event data would be largely immutable without significant effort. The disclosed approaches provide many additional capabilities as described further below.

FIG. 1 illustrates a block diagram 100 in accordance with an embodiment of the disclosed subject matter. In particular, FIG. 1 illustrates an example of use of distributed ledger technology in establishing a data set chronicling or notarizing a time duration of a gaming event. A gamer 102 is depicted in FIG. 1 Gamer 102 uses a gaming computer or device 104 in playing or participating in a game. The gaming computer or device 104 is communicatively coupled to a network 106. Although a single gamer 102 and gaming computer or device 104 is depicted, in some embodiments, multiple gamers can play on multiple gaming computers or devices. For example, each gamer can play on a different gaming computer or device, or one or more gamers can share a gaming computer or device. The multiple gamers may be playing separately or together, in whole or in part, physically or conceptually/virtually, in an enhanced reality setting, etc. They may be playing with one another in a game, or playing in the same game or separate or multiple games. They may be playing against one another, competing with one another, competing with one another one-on-one or as part of groups, competing with one another in a larger event, teamed with or cooperating with one another, etc. All configurations of players, groups of players, AI-based entities, or other entities playing a game are contemplated. For example, a group of players can play against one another in a battle royale game (e.g., Fortnite®, PUBG®, H1Z1®, etc.) or poker game in an amateur setting where the players are distributed over the entire globe. Alternatively, all the players may be located in a central eSporting arena for a sanctioned event where multiple teams play multiple gaming sessions against one another. Thus, there can be many possible variations of the combinations of gamers, computers, networks, or other aspects of the event.

As illustrated in FIG. 1, one or more servers 108 (e.g., three servers 108) are depicted. The servers 108 are communicatively coupled to the network 106. As depicted in FIG. 1, the servers 108, the gaming computer(s) or device(s) 104, and peer computer(s) or device(s) 111 are communicatively coupled to the network 106 directly or indirectly. In some embodiments, although not depicted in FIG. 1, many other computing devices or items, physical or virtual, may also be communicatively or operatively coupled to the network 106, gaming computer(s) or device(s) 104, and/or peer computers or device(s) 111. Although depicted as a single network 106, in various embodiments, one or several networks and subnetworks are contemplated that may be of any or many different types (e.g., Internet, Intranet, Wi-Fi network, Ethernet, near range communication network, etc.). In some embodiments, the gaming computer(s) or device(s) 104 can operate in whole or in part as client(s) of one or more servers (e.g., servers 108); and/or operate, in whole or in part, independently of any servers or not as client(s). Embodiments are contemplated in which gaming or gaming related application(s) and software are executed by the gaming computer(s) or device(s) 104 or by server(s), or a combination of both or in a virtualized or cloud environment.

As depicted in FIG. 1, one or more peer computer(s) or device(s) 111 can be used to implement a ledger data structure (e.g., a distributed ledger, blockchain, etc.) 110. The ledger data structure 110 may be a distributed ledger data structure implemented on a plurality of peer computer(s) or device(s) 110, or may, in some cases, be a centralized or semi-centralized data structure implemented on one or more peer computer(s) or device(s) 111. The ledger data structure 110 can be used to store data 109 (which can include data streams). Data 109 include data associated (which can include being associated broadly, generally, loosely, etc.) with the gaming computer(s) or device(s) 104 and data associated with gaming (e.g., in-game events).

In FIG. 1, four peer computer(s) or device(s) 111 are depicted, but any practical number of peers are contemplated. The term "peer" is intended to be broadly construed to include, for example, any or all different types, configurations and operations of computing nodes implementing or participating in distributed ledgers and related techniques. Furthermore, various embodiments contemplate various types, uses and implementations of distributed ledger technologies, as discussed further herein. Still further, embodiments are contemplated that do not or do not only utilize peer participation. For example, ledger data structures (e.g., blockchain technologies, etc.) can be used in a centralized manner in a single computer or system rather than distributed across multiple computers. In some embodiments, the use or operation of a ledger data structure (e.g., a distributed ledger data structure) can be iterative; and/or can be pre-, during, or post—at least a portion of the gaming period.

The data 109 can include chronologically ordered or delivered data as well as non-chronologically ordered or delivered data or other data, data delivered throughout the gaming period, at times or durations during the gaming period, at one time during the gaming period, etc. As described further herein, the data 109 can broadly include various types of data, including, for example and without limitation, in-game and gamer/player related data, gaming computer and game related data, network related data, server related data, environmental data, etc.

As depicted in FIG. 1, use of a ledger data structure (e.g., a distributed ledger data structure) can facilitate recording data 109 in establishing a data set 112 chronicling at least a portion of the gaming duration. Chronicling the gaming duration is broadly intended to include chronicling any, some or all of various aspects, elements, etc. of the gaming duration. A "gaming duration" or "gaming period" is broadly intended to include, for example, the entire duration or any portion or portions of the duration of a game, which can include all or a portion of a game, game episode, game competition, game sequence, game division, a snapshot of time, pre-game preparation, post-game review, a gaming season, etc. For example, a gaming duration or gaming period can include one or more of a 1 ms, 100 ms, 1 second, 10 seconds, a minute, or any other unit of time.

Furthermore, as depicted, in some embodiments, the data set 112 is configured or provided to be used, is useable or is actually used in various ways and for various purposes, as described further herein. As illustrated in an example use 114 in FIG. 1, the data set 112 can be used in establishing or proving facts relating to the gamer, game or gaming duration, such as by a centralized, standards, certification, validating or notarizing body; used in preventing or detecting cheating; or used in recording, playback or reconstruction of game play status or aspects, such as at particular times, etc. However, embodiments are also contemplated that do not include or comprehend such aspects or that conclude with the establishment of the data set 112. One should appreciate that one aspect of the disclosed subject matter is to provide a validated or notarized record of game play. Thus, system 100 can be leveraged to validate or notarize a gaming event (e.g., eSports event, gambling tournament, physical gaming event, motor race, classic board game such as "Go", miniature-based game, war game, etc.).

Figure 2:
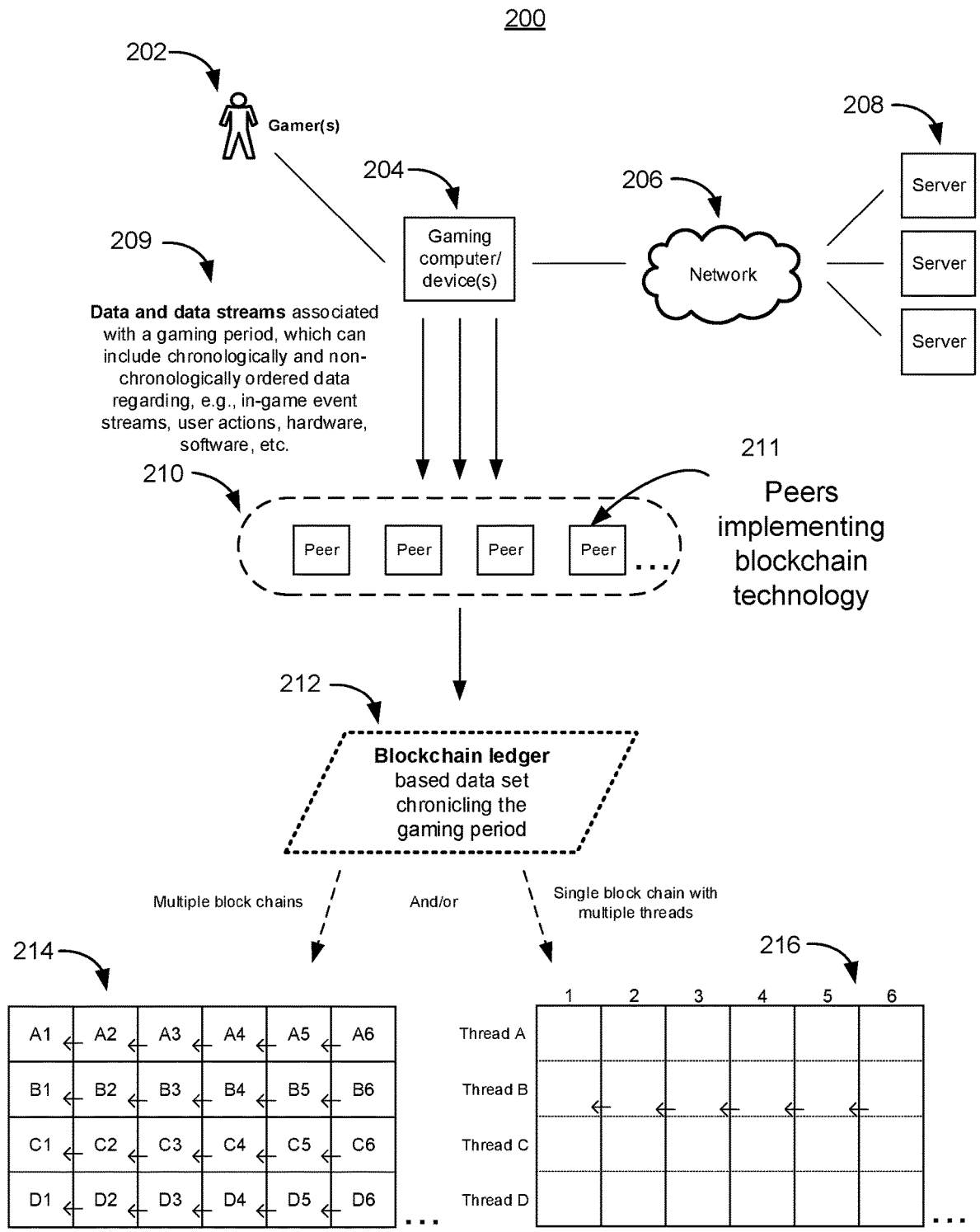
FIG. 2 illustrates a block diagram in accordance with an embodiment of the disclosed subject matter, including use of blockchain technology in establishing a data set chronicling a duration of a gaming event, the data set including multiple chains of blocks or one or more chains each including multiple threads.

FIG. 2 illustrates a block diagram 200 in accordance with an embodiment of the disclosed subject matter, including use of blockchain technologies in establishing a data set chronicling a duration of a gaming event including one or more chains of blocks or one or more chains of blocks including multiple threads. As depicted in FIG. 2, a gamer 202 uses one or more gaming computer(s) or device(s) 204, which are communicatively coupled to a network 206. Network 206 is communicatively coupled to one or more server computers 208. In some embodiments, as depicted in FIG. 2, one or more peer computer(s) or device(s) 211 can implement a blockchain data structure 210 to record and store data 209 associated with a gaming duration. As a result, one or more peer computer(s) or device(s) 211 can establish a blockchain ledger-based data set 212, which may be a blockchain ledger or ledgers. In FIG. 2, gamer 202, gaming computer(s) and device(s) 204, network 206, server(s) 208, and peer computer(s) or device(s) 211 can be the same or substantially the same as gamer 102, gaming computer(s) and device(s) 104, network 106, server(s) 108, and peer computer(s) or device(s) 111 as described above. Thus, they are not repeatedly described.

In some embodiments, as depicted in FIG. 2, the blockchain ledger-based data set 212 includes multiple blockchains 214 with a single thread. In some embodiments, the blockchain ledger-based data set 212 includes a single blockchain 216 with multiple threads. It is appreciated that data set 212 can include a combination of multiple blockchains 214 and single blockchain 216, and/or any other or different configurations or variations. As shown in FIG. 2, in a configuration such as the multiple blockchains 214, the blockchain ledger based data set 212 includes multiple blockchains (depicted as blockchains A through D), each having multiple blocks (depicted as blocks A1-A6, B1-B6, and so forth). It is appreciated that any of various numbers of chains and blocks per chain, or different numbers of blocks per chain, or groupings, organizations or structuring of chains are contemplated or even incorporating other outside blockchains from other applications and services, such as in-app purchases. In a configuration such as the single blockchain 216 with multiple threads, the blockchain ledger-based data set 212 includes a single blockchain having multiple threads of data (depicted as threads A-D). It is appreciated that any of various numbers of threads are contemplated, such that, as depicted, each block of each thread contains elements of each thread, although many other arrangements, structures, variations and organizations are possible.

In some embodiments, a plurality of blockchains (e.g., blockchains A through D) and/or a plurality of threads in a same blockchain can be configured to form a hierarchy of blockchains or threads. For example, one or more peer computer(s) or device(s) 211 obtain data 209 and use a blockchain data structure 210 to facilitate recording data 209 in establishing data set 212, such that data set 212 includes a plurality of blockchains representing a hierarchy of blockchains. As illustrated in FIG. 2, for instance, data 209 may include data or data streams associated with National Football League (NFL) games, such as digital representations (e.g., videos) of the NFL games played by different NFL teams, statistics of NFL players (e.g., quarterbacks), time stamps of in-game events (e.g., touchdowns), etc. In some embodiments, one or more peer computer(s) or device(s) 211 facilitate recording of data 209 to establish data set 212 that includes multiple blockchains 214. One or more blockchains in blockchains 214 can be configured to represent data chronicling games of different NFL teams. As one example, in establishing data set 212, one or more of peer computer(s) or device(s) 211 can configure (e.g., store, update, edit, verify, notarize, etc.) blockchain A of multiple blockchains 214 to represent data chronicling games played by the Los Angeles Rams. Similarly, blockchain B of multiple blockchains 214 may represent data chronicling games played by the Seattle Seahawks; blockchain C of multiple blockchains 214 may represent data chronicling games played by the San Francisco 49ers; and so forth.

As another example, one or more blockchains of blockchains 214 can be configured to include one or more blocks or one or more sub-blockchains. One or more of peer computer(s) or device(s) 211 can configure (e.g., store, update, edit, verify, notarize, etc.) a block or a sub-blockchain in a particular blockchain to represent data chronicling a single game played by a particular NFL team. For instance, blockchain A as illustrated in FIG. 2 may be configured to include six blocks A1-A6 or six sub-blockchains (not shown). Each block or sub-blockchain may represent data chronicling games played by the Los Angeles Rams against another NFL team (e.g., 49ers, Seahawks, etc.). Similarly, blockchain B as illustrated in FIG. 2 may be configured to include six blocks B1-B6 or six sub-blockchains (not shown). Each block or sub-blockchain may represent data chronicling games played by the Seattle Seahawks against another NFL team. The other blockchains C and D as illustrated in FIG. 2 can be configured in a similar manner. As a result, blockchains 214 can be configured to have a hierarchical data structure. It is appreciated that while blockchains 214 in FIG. 2 depicts six blocks or sub-blockchains (not shown), any number of blocks or sub-blockchains can be configured or used to implement the blockchains. And blockchains 214 may include any number of blockchains, not limited to four as illustrated by blockchains A-D.

In some embodiments, one or more peer computer(s) or device(s) 211 can establish the hierarchical structure of blockchains 214 by linking, aggregating, or integrating newly established blockchains to previously established blockchains. Using the above example, in establishing data set 212, one or more of peer computer(s) or device(s) 211 can configure (e.g., store, update, edit, verify, notarize, etc.) blockchain A of multiple blockchains 214 to represent data chronicling games played by the Los Angeles Rams, and configure blockchain B to represent data chronicling games played by the Seattle Seahawks. In configuring blockchain B, information (e.g., a hash value) may be included in the genesis block of blockchain B to indicate that blockchain B is related to blockchain A because it also chronicling an NFL game. Thus, blockchain B can be integrated to blockchains 214, which represent data chronicling NFL games. Similarly, in FIG. 2, blockchains C and D can be linked to blockchains A and/or B and thus integrated to blockchain 214. As a result, blockchain 214 include multiple blockchains A-D representing data chronicling data of NFL games.

In some embodiments, sub-blockchains can also be linked to one another or integrated to a parent blockchain in a similar manner. For example, a sub-blockchain representing data chronicling a Superbowl game played by the San Francisco 49ers may be integrated to a parent blockchain for the San Francisco 49ers by including relevant information (e.g. hash values) in a genesis block of the sub-blockchain. A parent blockchain can be linked to multiple sub-blockchains. For example, multiple sub-blockchains can represent a plurality of games, all played by the 49ers. These multiple sub-blockchains can be linked to a same parent blockchain.

As described above, in some embodiments, a single blockchain 216 can have multiple threads (e.g., threads A-D) to represent data chronicling games. The single blockchain 216 and the multiple threads can be configured by, for example, one or more peer computer(s) or device(s) 211 to represent data chronicling games. For instance, the single blockchain 216 may represent data chronicling all NFL games played by the Los Angeles Rams, with each of the threads representing data chronicling an individual game played by the Los Angeles Rams. As another example, the single blockchain 216 may represent data associated with a particular NFL team, with each of the threads representing data associated with each individual player in the particular NFL team. It is appreciated that the structures of blockchains 214 and blockchain 216 can be configured in any desired manner, not limited to the above examples.

In some embodiments, one or more peer computer(s) or device(s) 211 can further establish or configure an indexing system for referencing to the hierarchical data structure as described above with respect to multiple blockchains 214 or single blockchain 216 having multiple threads. For example, an indexing block can be established in the multiple blockchains 214 or single blockchain 216 to provide quick reference or lookup of an individual blockchain, a block, or a thread within a hierarchical data structure.

Figure 3:
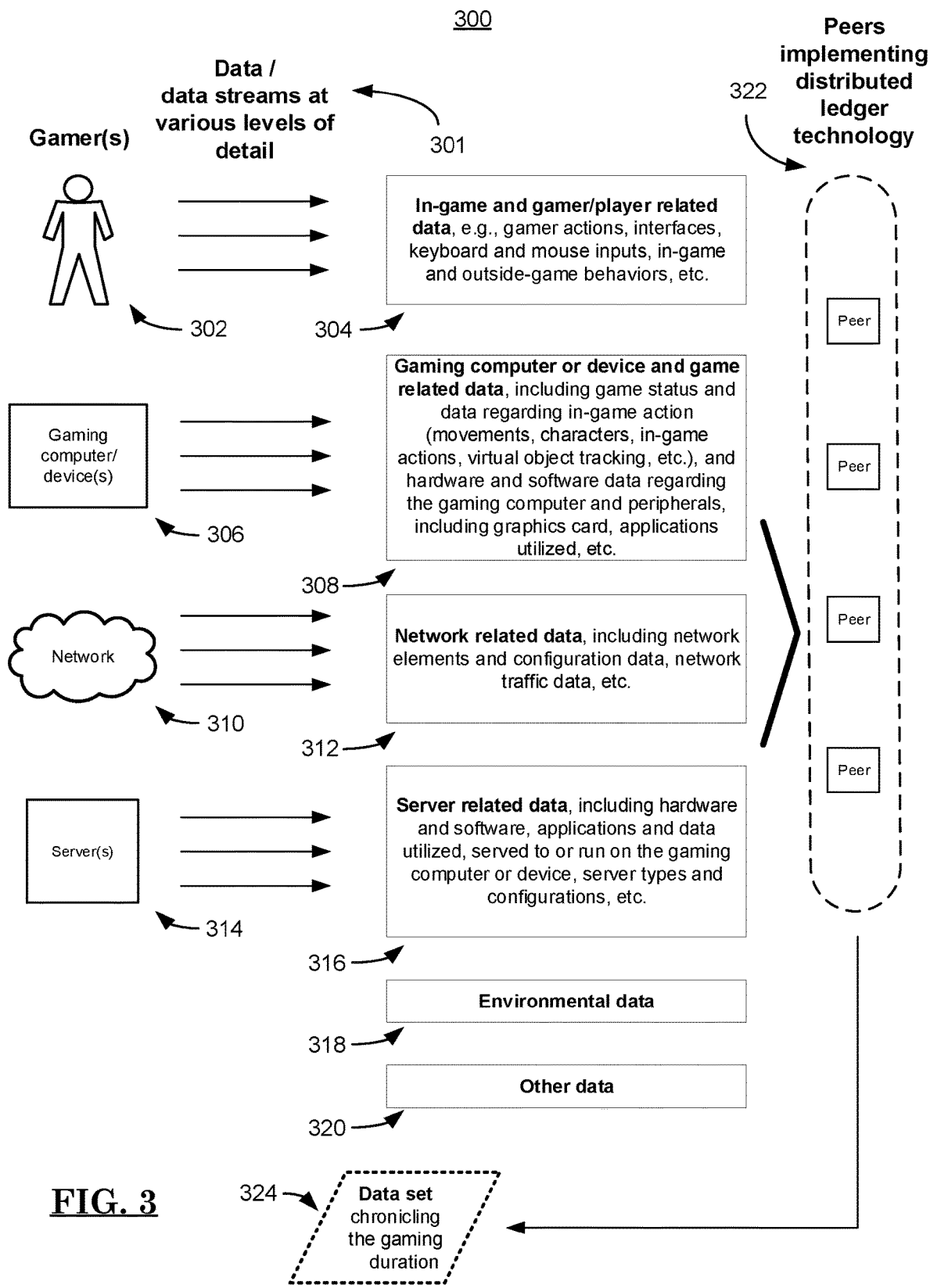
FIG. 3 illustrates a block diagram in accordance with an embodiment of the disclosed subject matter, including example sources of and types of data streams.

FIG. 3 illustrates a block diagram 300 in accordance with an embodiment of the disclosed subject matter, including an illustration of example sources of and types of data streams. The various example data sources provide data or data streams (e.g., data 109 or 209 shown in FIGS. 1 and 2, or data and/or data streams 301 in FIG. 3) to peer computer(s) or device(s) (e.g., peers 111 or 211 in FIGS. 1 and 2, or 322 in FIG. 3) implementing ledger data structures. As depicted in FIG. 3, based on the data and/or data streams 301, one or more peer computer(s) or device(s) 322 can implement distributed ledger data structures, in a manner similar to those described above, to establish a data set 324 chronicling a duration of a gaming event. Data and/or data streams 301 may be associated or provided by, for example, with one or more gamers 302, one or more gaming computers or devices 306, one or more networks 310, one or more servers 314, etc., and/or other physical, conceptual, virtual or enhanced reality items, etc. Data and/or data streams 301 can include or be associated with, multiple types of data, multiple data streams, data streams at different levels of granularity, detail, or fractal levels as discussed further herein, etc. In FIG. 3, although features 304, 308, 312 and 316 are depicted in connection with particular ones of features 302, 306, 310, and 314, the connections may be different than that appearing in the illustration of FIG. 3.

The data and/or data streams 301 can include, for example, in-game and gamer/player related data 304, gaming computer or device and game related data 308, network related data 312, server related data 316, environmental data 318, and other data 320. In-game and gamer/player related data 304 can include, for example, gamer actions, interfaces, keyboard and mouse inputs or movements, in-game and outside-game gamer or other behaviors, etc. In some embodiments, a game can be computer-based game (e.g., video game, eSporting game). For a computer-based game, a gaming computer or device (e.g., devices 104 or 204 as shown in FIG. 1 or 2) can provide in-game and gamer/player related data 304 based on monitoring, recording, and/or recognizing, for example, gamer actions, keyboard and mouse inputs or movements, and other gamer behaviors sensed or received by the gaming computer or device.

A gamer can be a human player or an AI-based entity. For a human player, game actions, keyboard and mouse inputs or movements, and other gamer behaviors can be monitored, recorded, and recognized by the gaming computer or device after it receives the human player's inputs to peripheral(s) of the gaming computer or device. As one example, the gaming computer or device can execute an application monitoring the number of the mouse clicks in a time duration, and then calculate the speed of mouse click. As another example, the gaming computer or device can also record in real time the game actions taken by the human player. The game actions may later be provided for establishing a data set 324 using a ledger data structure (e.g., distributed ledger or blockchain). The data set 324 can then be used in preventing and/or detecting cheating or other impermissible gaming behaviors (e.g., an excessive speed of mouse clicking, impermissibly exploiting or circumventing certain constraints of the game, etc.).

If one or more of the gamers in a game are AI-based entities, the gaming computer or device can also monitor, record, and recognize game actions and gamer behaviors associated with the AI-based entities. In some embodiments, the gaming computer or device can identify that a gamer is an AI-based entity and monitor the movements made by the AI-based entity. For instance, the AI-based entity identification can be based on the type of game and known AI-based entities (e.g., a steward in the DARPA Grand Challenge game is a known AI-based entity), a detection that the entity can make a movement in a game without providing inputs to a peripheral device such as a keyboard or a mouse, or that the entity can make a movement at a speed that is beyond certain limit (e.g., much faster than a human can do). In some embodiments, the gaming computer or device can include the identification of an AI-based entity in the data 301 provided for establish data set 324 using a ledger data structure.

Further, the gaming computer or device can obtain data related to the AI-based entity including, for example, AI algorithms, applications, parameters, boundaries, limitations, rules, AI training data, AI test data (e.g., test vector), etc. The gaming computer or device can also include these data related to the AI-based entity in the data and/or data stream 301 provided for establishing data set 324 using a ledger data structure. In some embodiments, when establishing data set 324 using a ledger data structure, the identification of an AI-based entity and other data related to the AI-based entity can be included in a genesis block of the ledger data structure. The data included in the genesis block can thus be used in preventing and/or detecting cheating or impermissible gaming behaviors (e.g., detecting whether an AI algorithm has been impermissibly altered or enhanced).

As described above, the gaming computer or device can obtain data associated with a computer-based game, whether played by human players, AI-based entities, or a combination of both. In some embodiments, the gaming computer or device can obtain data associated with a physical game (e.g., a physical football game, a physical hockey game, a physical basketball game, etc.), rather than a computer-based game. A physical game is played by human players in a non-computer-generated gaming environment. For example, a physical basketball game is played by two teams of human players in a physical basketball court, rather than a virtual computer-generated environment.

For a physical game, in some embodiments, additional hardware and/or software may be required to facilitate the gaming computer or device to obtain in-game and gamer/player related data. Using a physical basketball game as an example, one or more cameras, motion tracking devices, facial recognition devices or applications, and/or image processing/recognition applications may be used for obtaining data related to the physical basketball game. For example, one or more cameras can be used to record videos or images of the physical basketball game from different angles. In some embodiments, all frames of a recorded video may be processed to be a digital representation of a time duration of the physical game (e.g., the entire game, half of the game, or any time duration of the game). In other embodiments, some but not all frames of a video may be processed. As one example, a video may be recorded for the entire physical game. The video can be processed to extract certain frames (e.g., key frames). The extracted frames may correspond to the desired part or time duration of the game. For example, the extracted frames may include frames corresponding to the time durations that games were actually played, excluding the time duration of commercials. As another example, the extracted frames may include every other frame of the recorded video. The extracted frames can thus be included as digital representations of the physical game (or a part thereof) in data 304.

As another example, the gaming computer or device, equipped with an event-driven camera and/or application, can record those frames corresponding to certain events (e.g., a scoring event, a foul event, etc.). The event-triggered recording may include the frames corresponding to the time duration of an event. In some embodiments, the event-triggered recording may also include a plurality of frames corresponding to a time duration prior to the event and a time duration after the event. For example, the event-triggered recording can include 4-5 frames for a pre-event time duration, the frames corresponding to the time duration of the event, and 4-5 frames for a post-event time duration. In some embodiments, in addition to recording frames of a video and processing the recorded frames to generate digital representations, the gaming computer or device can also obtain metadata such as time stamps of identified events and correlate the time stamps with the recorded frames. In some embodiments, the time stamps, and any other metadata associated with the recorded frames (e.g., resolutions, encoding/compression algorithms, compression ratios, etc.) can be included in the data 304.

In some embodiments, to obtain in-game and gamer/player related data associated with a physical game, a gaming computer or device can account for delays associated with certain events in the physical game. For example, a scoring event in a physical basketball game may be controversial and thus the referee may take some time to decide whether the score should be counted. This causes a delay between the scoring event and the recognition/counting of the score. In a physical basketball game, the gaming computer or device can account for that delay by, for example, monitoring or tracking (e.g., using a camera or other sensors) one or more of the scoring player, the basketball, the basket, referee, and the scoreboard. Based on the monitoring data, the gaming computer or device can, for example, correlate between the event that the scoring player successfully shoots a basket and the event the scoreboard changes to count the points. Based on the correlation, the gaming computer or device can calculate the delay and include that delay in data 304 as metadata for establishing data set 324 for chronicling the game duration.

In some embodiments, one or more of the cameras and motion tracking devices can be used to track the movements of one or more human players and the movements of one or more objects in a game (e.g., a basketball, a football, a hockey puck, etc.). For example, the gaming computer or device can be equipped with facial recognition devices and/or applications, speech recognition devices and/or applications, and/or image processing/pattern recognition devices and/or applications. The facial recognition devices and/or applications can facilitate recognition of each individual players. Speech recognition devices and/or applications can facilitate recognizing the speech of the players, the referees, the coaches, etc. And the image processing/pattern recognition devices or applications can process the videos or images captured by the cameras, analyze the captured videos/images, provide the status of the scoreboard, recognize the baskets at the two ends of the court, recognize a goal event (e.g., a two-point basket or a three-point basket), recognize the boundaries of the court, recognize the referee's hand signals, etc. It is appreciated that one or more cameras, motion tracking devices, facial recognition devices or applications, and/or image processing/pattern recognition applications are examples of hardware devices and software applications that can be used to facilitate the gaming computer or device to obtain the in-game and gamer/player related data 304 related to a physical game.

In some embodiments, the tracking of the movements of one or more human players and the movements of an object in a game can be performed in real time or substantially real time. For example, one or more cameras and/or sensors can be used to track the movement of a hockey puck in real time. The hockey puck can first be identified by an image processing device and/or application using, for example, pattern recognition technologies. The hockey puck can then be tracked as the puck moves within or around the ice rink. The tracking of the puck can be based on technologies such as edge detection, scale-invariant feature transform (SIFT), pattern recognition, etc. Further, the tracking of the puck can also be correlated to the position of the puck to determine, for example, whether the puck is inside one of the nets (e.g., to determine whether a goal has been scored). The position of the puck can be determined, for example, based on known coordinates of the ice rink and the relative distance/angles between the puck and other known positions (e.g., distance/angles between the puck and the boards). In some embodiments, the correlation between the position of the puck and the one of the nets can be used to determine whether there is a scoring event (e.g., the overlapping between the puck's position and the position of the net or goal line exceeds a threshold). Similar to those described above the data associated with tracking the hockey puck (and any other object of a physical game) can be included in data 304 for establishing data set 324 chronicling the game duration.

In addition, the gaming computer or device may also obtain data related to rules and/or constraints associated with the physical game. For example, a gaming computer and device can obtain the basketball scoring and playing rules from the Internet or other proper sources. The gaming computer and device can also obtain constraints associated with a game, such as the shape, size, and contour of a golf course, the location of the 18 holes in a particular golf course, the location of the fences in a particular baseball stadium, the type of surface of a tennis court, the track limits of a particular motor racing track, etc. In some embodiments, a play envelop can be generated or defined based on the obtained rules and constraints. The play envelop represents the metes and bounds within which a physical game should be fairly played. The gaming computer or device can include the rules, constraints, and/or play envelops in data 304. And similar to those described above, data 304 may later be provided for establishing a data set 324 using a ledger data structure (e.g., distributed ledger or blockchain). The data set 324 can then be used in preventing and/or detecting cheating or other impermissible behaviors. For example, using a data set 324, the play envelop can be compared to the video/image data frame representing a scoring event by a particular player. Because data set 324 implements a distributed ledger data structure or a blockchain structure, the risk of unauthorized tampering or hacking of the data set 324 can be greatly reduced or eliminated.

In some embodiments, there may be a delay between an event of rule/constraint violation and the detection/recognition of the violation. And the gaming computer or device can account for such a delay associated with the rule/constraint violation event. For example, in a car racing game (e.g., a Formula One race), a driver may have violated a rule or constraint (e.g., a track limit) without his or her awareness. The violation may be captured by camera or other sensors, identified, and reported to the steward(s). The steward(s) may then decide whether a true violation has occurred. Thus, there may be time delay between the occurring of the violation and the detection or recognition of the violation. The gaming computer or device can account for this delay and associate this delay with the potential violation event. The delay data can be included in data 304 for establishing data set 324 using a ledger data structure (e.g., distributed ledger or blockchain) to prevent subsequent cheating or dispute.

As depicted in FIG. 3 and described above, the data 301 can also include gaming computer or device and game related data 308. In some embodiments, data 308 can include game status and data regarding in-game actions, such as movements, characters, in-game actions and tracking, mouse movements and clicks, virtual object tracking, etc. In some embodiments, data 308 can include hardware and software data, interfaces, responses, status, operating system (OS) checksums, hardware or software performance data, etc., such as regarding the gaming computer and peripherals, including graphics card information, applications utilized, etc.

As depicted in FIG. 3, data and/or data stream 301 can further include network-related data 312, including network elements and configuration data, network traffic data, which can include mapping or association data in relation to the gaming or game play, etc. Still further, data and/or data stream 301 can include server related data 316, including hardware and software, applications and data utilized, served to or run or executed on the gaming computer or device, server types and configurations, etc. Data and/or data stream 301 can also include environmental data 318, such as data associated with the physical, virtual, conceptual or enhanced reality gaming environment or area, even beyond the gamer and computer-related and network-related elements, such as, for example, the physical, virtual or conceptual space including, around or associated with any of such elements or other elements, such as other elements associated with the game, game play, game environment, game or tournament virtual, enhanced reality or physical indoor or outdoor space, etc. Various embodiments contemplate potentially other data 320 as well.

In some embodiments, different chains, or threads of chains as depicted in FIG. 2, could be used to capture such things as video or audio relating to players during gaming, chains representing software execution on particular computers or devices, threads relating to particular players' gameplay, threads relating to a particular team's play or interactions, etc. As illustrated in FIG. 3, data and/or data stream 301 (including one or more of data 304, 308, 312, 316, 318, and 320) are provided to peer computer(s) or device(s) 322 that implement a ledger data structure (e.g., a distributed ledger or blockchain), as described in more detail below.

Figure 4:
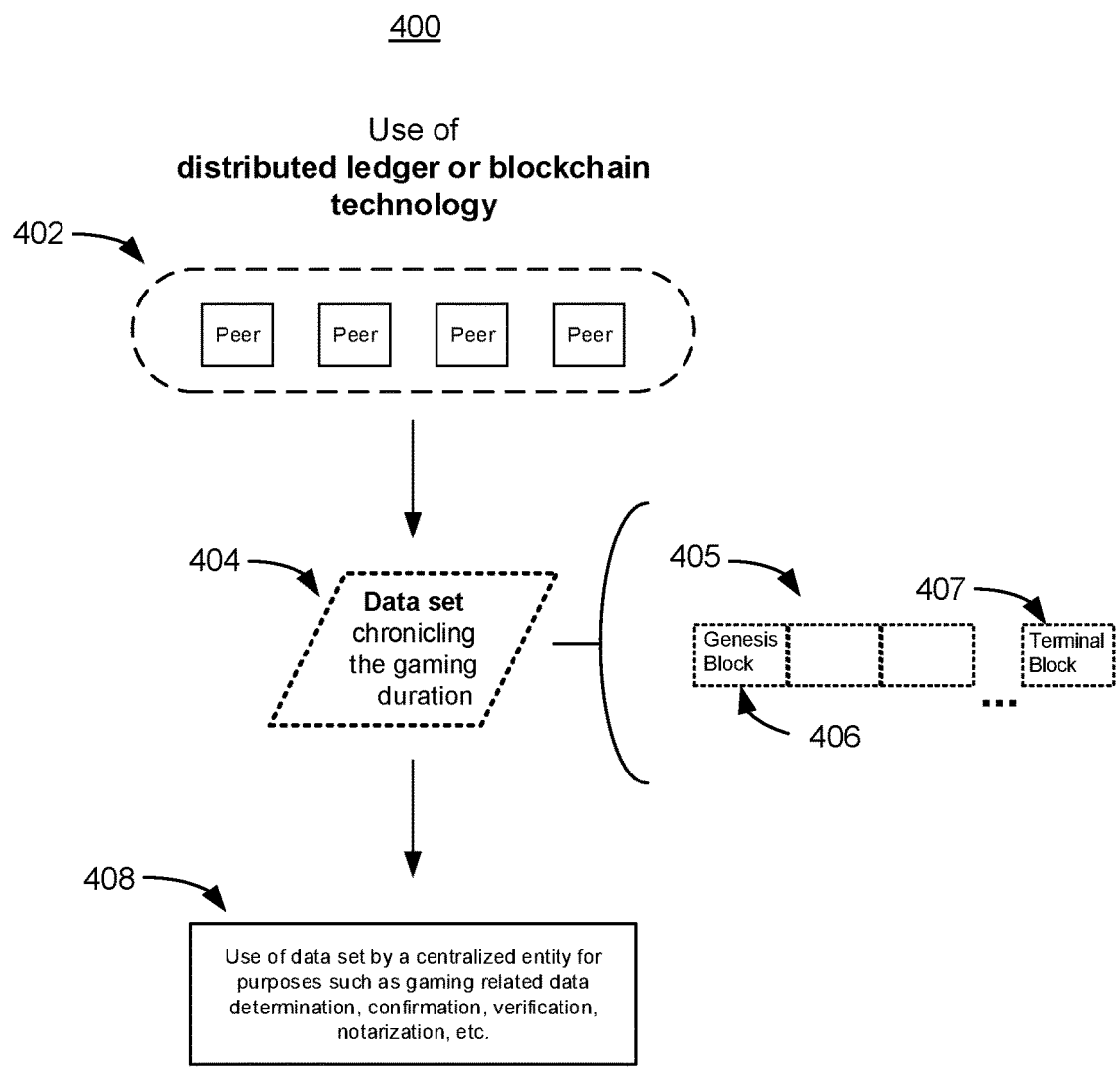
FIG. 4 illustrates a block diagram in accordance with an embodiment of the disclosed subject matter, illustrating use of distributed ledger technology in establishing a data set chronicling a time duration of a gaming event, including in connection with or for use by a centralized entity.

FIG. 4 illustrates a block diagram 400 in accordance with an embodiment of the disclosed subject matter. One or more peer computer(s) or device(s) 402 implement a distributed ledger data structure in establishing a data set 404 chronicling a time duration of a gaming event. It should be appreciated that the gaming event can comprise one or more time durations. Each duration may comprise one or more regular units of time (e.g., 1 second units, 10 second units, 1 minute units, etc.) or irregular units of time. The irregular units can be determined by other gaming metrics (e.g., a unit of time that represents 1000 key strokes, a unit of time that represent in-game movements, a unit of time that represents in-game kills, a unit of time that represent amount of data received, etc.). Establishing the data set 404 by the one or more peer computer(s) or device(s) 402 using the distributed ledger or blockchain data structure can be performed in a similar manner as described above. In some embodiments, the data set 404 can be configured for use by, useable by, or used by a centralized entity, such as for gaming related data determination, confirmation, authentication, verification, notarization, or other reasons, for any of various entities such as gamers, gaming organizations, game development companies and many others. It should be further appreciated that data set 404 can be stored as a ledger data structure in a distributed, semi-centralized, or centralized manner where each approach offers various advantages. In embodiments where the ledger data structure is distributed (i.e., decentralized), the ledger data structure is more robust with respect to falsification because all copies of the data structure would need to be altered at the same time to alter the complete record. In centralized embodiments, the ledger data structure can take less storage space and less network bandwidth because multiple copies are not required to be stored or passed among many peers. A semi-centralized ledger data structure may represent a combination of enhanced security (by distributing copies of data) and less storage space. In FIG. 4, block 408 represents use of the data set by a centralized entity, such as in notarization related uses or other uses.

In some embodiments, ledger data structures can be configured such that the elements of ledger data structures are particularly adapted to various gaming-related uses as described herein. Such ledger data structures implement data set 404 and can be stored in one or more distributed computers or computing nodes. As depicted in FIG. 4, for example, a blockchain 405 (which can, alternatively, be some other chain or other ledger-based structure), includes a genesis block 406 and a terminal block 407 in a ledger data structure. A genesis block 406 is the first block of a blockchain. A terminal block 407 is the last block of a blockchain. In some embodiments, for example, the genesis block 406 and/or the terminal block 407 can include an external time stamp, a token from an external ledger (e.g., a hash value from a current block in the Bitcoin blockchain, etc.), governing body official signatures possibly as a sign-off, and/or other information useful at the end of the chain representing or evidencing, for example, the gaming event, etc.

Some embodiments provide, for example, a blockchain or other ledger-based data structure that is adapted to uses including logging of game-related data, as well as uses such as later notarization, etc. Each block (or other structure, including other distributed ledger structure) may be associated with the previous block, and may include data particularly related to gaming, logging and notarization purposes as described herein. As one example, the blockchain 405 can be a self-referential blockchain. In establishing the blockchain 405, each block can be validated against one or more previously established blocks. The validation may be performed by, for example, comparing the data stored in a block (e.g., mouse resolution, mouse clicking speed, etc.) with specifications of hardware and software used in the particular game (e.g., the maximum mouse resolution of the mouse). If the comparison results indicate that the data stored in the block do not satisfy the specification, the validation may fail. For instance, if the data indicates that a particular action or movement is so fast that it exceeds the maximum mouse clicking speed in the specification, the validation fails. A failed validation in turn may flag or indicate that an abnormal behavior (e.g., cheating or tampering) may have occurred during the game. In some embodiments, the specifications of the hardware and software used in the particular game can be stored in, for example, the genesis block 406 and/or one or more previously established blocks of the current block being established and validated. In some embodiments, the validation of the data in a block being established or validated can be based on certain predefined criteria. For example, in establishing the blockchain 405, the validation of the data in the current block can be triggered or performed if one or more predefined criteria are met (e.g., new data is being added, some portion of the data is outside of normal range, etc.). Triggering or performing validation based on predefined criteria can more efficiently use limited computing resources and enhance the speed of validation.

In some embodiments, the genesis block 406 may incorporate particular data structure elements to provide advantages and technological solutions to problems generally relating to these purposes, such as in recording, tracking, and obtaining or later determining gaming related data. For example, genesis block 406 may represent the initial block for chronicling an eSporting event. In such a case, genesis block 406 can include information associated with the players, teams, server software version numbers, gaming software version numbers, hardware serial numbers, initial latency measurements, network analysis metrics (e.g., packet loss, latency, etc.), list of software running on each gaming computer, threads running on each computer, checksums for computer memory to ensure that each player has an exact copy of the gaming system configuration, hard drive information, or other types of data.

In some embodiments, the data structure used to establish data set 404 may be configured to allow determination of patterns of particular types of data or chronologically occurring data, within gaming or gameplay. For example, patterns that may typically be associated with cheating or tampering may be used to detect cheating or a high probability of cheating or other anomalies. Other patterns or metrics may indicate something outside normal ranges, which may require further analysis, etc. Other patterns may suggest or indicate a particular player's activities or behaviors. Example techniques that could be adapted to identify anomalous, possibly cheating, behaviors are described in U.S. Pat. No. 9,716,723 entitled "Vector-Based Anomaly Detection" filed Oct. 20, 2015, which is hereby incorporated herein by reference in its entirety. For example, an envelope of expected game play can be defined. If a player's behaviors exceed the expected envelope of game play, then an anomaly may be present, or that particular player may have found an exploit and may have been cheating. In some embodiments, the envelope can be defined based on one or more of the following game play metrics: input rate (e.g., clicks per second, keystrokes per second, etc.), network latency, in-game movement rates, kills per second, constraints of the game, or other game related metrics.

In some embodiments, threads as depicted in FIG. 2, or combinations of threads, may be analyzed for these purposes, such as in recording, tracking, and obtaining or later determining gaming related data. In some embodiments, threads relating to particular players can be tracked or even provided, for example, by subscription to fans, etc. Individual threads can track, for example, individual players and player game play, commands or actions, various operating system or other computing system threads, etc.

In some embodiments, machine learning or artificial intelligence techniques may be used to identify or detect patterns, for example. Patterns or metrics may be derived or detected with use of machine learning or artificial intelligence techniques or even fed into a neural network for analysis and use, for example. Different strands of data, such as those depicted in FIG. 2, could all be used as part of training set data. More specifically, a player's historical game play data can be used to train a neural network. Current game data from the player can then be fed into the trained neural network, which then determines if the game play appears nominal or anomalous relative to previous plays. An astute reader will appreciate that the historical game play data may include nominal game play data or cheating data. Further, the historical game play data does not necessarily have to be isolated to a specific player, but can be representative of a data from a cohort of players with respect to one or more specific games.

Furthermore, records of multiple gaming events can, in some embodiments, be used as part of training data sets to enhance and refine machine learning models, features, neural networks, pattern definition, association with particular activities or statuses, detection, etc.

Also, in some embodiments, machine learning or artificial intelligence can be used with regard to such training data sets in generating new games, gaming settings or gameplay instances, etc. Furthermore, gameplay feedback (e.g., feedback analysis provided by machine learning or artificial intelligence technologies) can be used to inform, facilitate or improve gameplay or technique by players, as well as to prove or validate facts, such as improved gameplay over time and events. For example, machine learning or artificial intelligence can be used for validating completion of tasks or actions (e.g., for training) by making sure that the user/player of a game completed all tasks using intentional actions and behaviors, e.g., to prevent luck from being the primary or major factor.

A benefit or advantage associated with using such notarized, player training data is that the data can be used to generate an AI-based entity of the player (e.g., an avatar). This gives rise to a new market. As a famous player continues to play, the famous player can offer access to their AI-based entities for different games in exchange for a fee. Further, the famous player can provide his or her AI-based entities having different gaming fidelity (e.g., easy, medium, hard, etc.) where each level of fidelity may fetch a different price. In view that professional players can play for years, such AI-based entities can be sold as a part of a subscription service where new releases of the updated versions of the AI-based entities occur at specific times, possibly after specific gaming events or on a periodic basis.

In some embodiments, a genesis block (e.g., block 406 in FIG. 4) may include particular designs, features and data to provide particular advantages and solutions to problems relating to gaming relating uses as described herein. For example, the genesis block may be used to store or represent initial, start of an event, or pre-event status or situation, such as may relate to hardware, software, network, initial states of devices, computer or network latency and other features. In some embodiments, the genesis block can facilitate, for example, a pre-event check or inspection, or later confirmation of satisfactory conditions or starting conditions. It can include information such as hardware or software checksums, threading, software and version identities and numbers, drivers, player and state data, time stamps, external hashes, etc. It can also include data such as may represent images or video of players or the environment, etc. In some embodiments, such information may be used to help determine that starting conditions are sufficiently similar between players, game events, etc., to ensure a sufficiently level playing field, or for many other purposes.

In some embodiments, to detect abnormal gaming behavior (e.g., cheating, data hacking, changing of data without authorization, etc.), information related to hardware and/or software (e.g., hardware or software checksums, threading, software and version identities and numbers, drivers, player and state data, time stamps, external hashes, etc.) can be repeatedly, intermittently, or randomly obtained and inspected. As described above, such information may be included in the terminal block 407. In some embodiments, the obtaining and/or inspection of the information can be performed within a gaming duration or in real time without significant impact to the performance of the game. For instance, a small portion of information can be obtained and/or inspected each time without demanding computing resources that may cause obvious game performance degradation. Examples of systems, methods, and devices for recognizing these behaviors and other actions and activities may be found at least in U.S. Pat. Nos. 9,547,678, 9,886,625, and 10, 216,984, as well as in U.S. patent application Ser. No. 16/284,972.

Furthermore, various embodiments contemplate various ways in which the chain or data structure is built or configured. For example, individual blocks may be added after a certain amount of time elapses, time slices or periods, a certain number of commands have been input or received, other events or amounts of events have occurred, or many other possible ways. Also, various embodiments contemplate various resources and balancing of resources used in developing, for example, the chain. For example, game servers, bandwidth or other resources can be used and balanced, such as in combination with considerations including game serving needs and other needs or loads. In some embodiments, a dedicated system can be used, or used in part, in supplying chain building resources, potentially depending on game serving needs and other load balancing considerations, etc.

Figure 5:
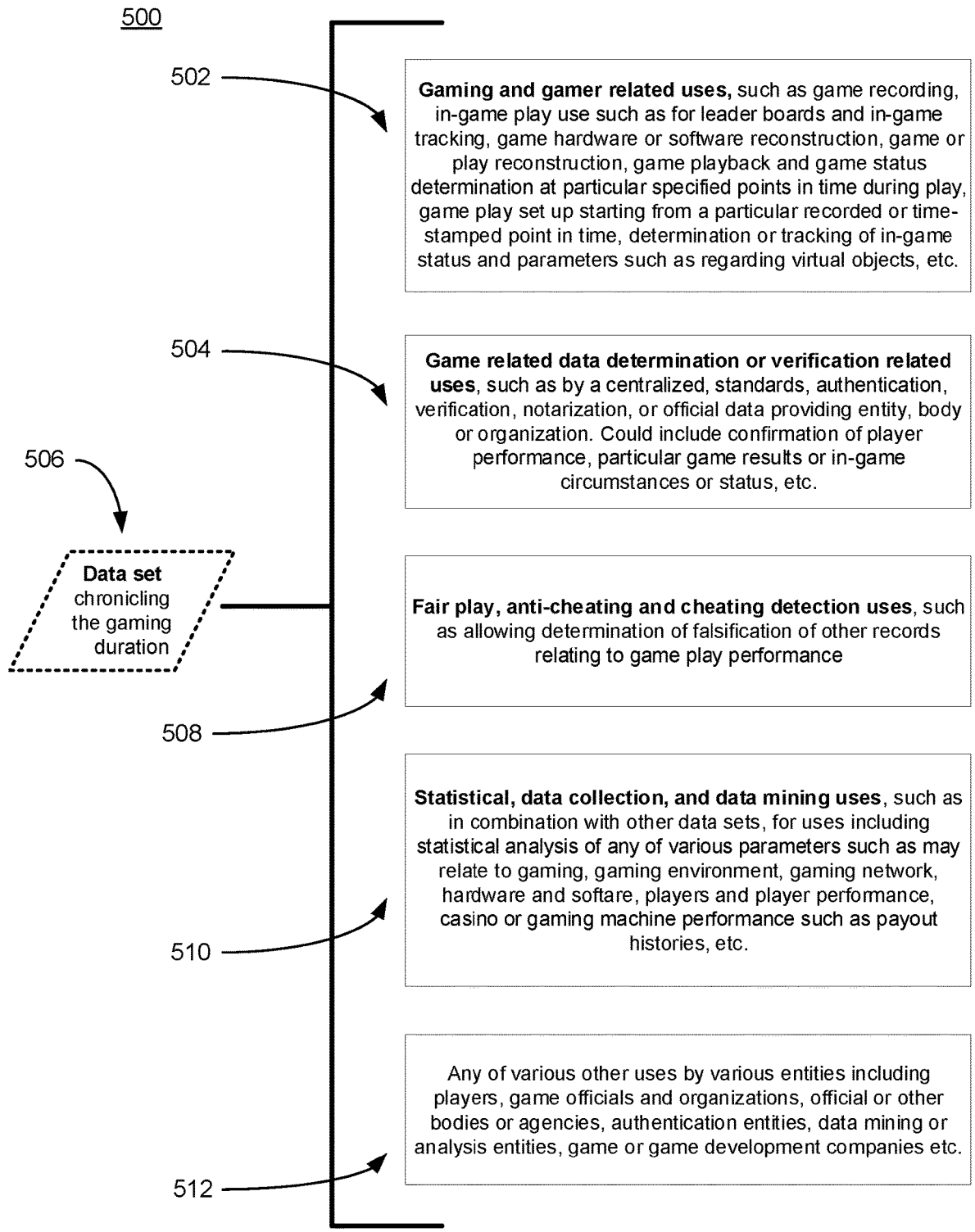
FIG. 5 illustrates a block diagram in accordance with an embodiment of the disclosed subject matter, illustrating various potential types of uses for a set of data chronicling a time duration of the gaming event.

FIG. 5 illustrates a block diagram 500 in accordance with an embodiment of the disclosed subject matter. Various potential types of uses for a data set 506 chronicling a time duration of the gaming event are illustrated. Data set 506 can be generated in a similar manner as data sets 112, 212, 324, or 404 as described above.

One type of use of the data set 506 includes gaming and gamer related uses 502. Uses 502 can include, for example, game or game element recording or playback; in-game play use such as for leader boards, score displays and real-time in-game tracking of various sorts; game hardware or software reconstruction; game, play, competition, event or tournament reconstruction; game status determination at particular specified points in time during play which can include hardware, software and other elements; gameplay set up, including hardware and software components, starting from a particular recorded point in time; determination or tracking of in-game status and parameters such as regarding virtual objects, enhanced or enhanced reality objects, and other uses.

The data set 506 can also be used, for example, for game related data determination or verification related uses 504, such as by a centralized, standards, authentication, verification, notarization, or official data providing entity, body or organization. Uses 504 can further include confirmation of player performance, particular game results or in-game circumstances or status including hardware or software aspects, including data on games or other applications, CPUs, graphics cards, peripherals, etc.

Various embodiments of the disclosed subject matter relate to use of ledger data structures (e.g., distributed ledger, blockchain technologies, etc.) in connection with notarization uses in relation generally to gaming. In some embodiments, blockchains include notary related data, such as, a hash from the previous block or a hash value from other external distributed ledgers, Bitcoin or Ethereum for example. In some embodiments, data collected and stored can be associated with official or governmental notarization related agencies, etc. Furthermore, some embodiments specifically provide or facilitate providing a service or services relating to notarization. This can include, for example, providing a service that might be termed "eSports Notary as a Service", or "eNaaS", which can be for providing notarization services in connection with facts or proof associated with eSports events. Such an eNaaS can be leveraged as an eSporting registrar where eSporting events can be officially logged, monitored, stored, certified, or otherwise managed in an official capacity possibly by a league organization. Thus, the disclosed subject matter is considered to include establishing eSporting standards by which gaming data is stored, monitored, certified, verified, notarized, or otherwise managed.

Furthermore, some embodiments may include providing or facilitating providing a system that cooperates with or works in conjunction with, for example, government, such as federal, state, county or local government, or other official agencies. For example, some embodiments include providing a system that stores and provides, or provides access to, data to such entities for use in providing or obtaining official notarization services or notarized information, such as in response to queries or particular needs depending on the context or entity obtaining the services.

As another example, the data set 506 can be used in connection with fair play, anti-cheating or cheating detection uses 508. Uses 508 can include, for example, helping to ensure or show fair play, anti-cheating and cheating detection, proof or evidence to disprove cheating or unfairness allegations, etc. It can also include uses such as allowing determination of, or of evidence of, falsification of other records relating to game play performance, or lack thereof, etc.

As a further example, the data set 506 can be used for statistical, data collection, and data mining and related uses 510. The data set 506 can be used in these regards, for example, in combination with other data or data sets, for uses including statistical analysis of any of various parameters such as may relate to gaming, the gaming environment, gaming network, hardware and software, players and player performance, casino or gaming machine performance such as payout histories, or many others.

Still further, the data set 506 can be used any of various other uses 512 by various entities including players, regulatory agencies, game officials and organizations, official or other bodies or agencies, authentication entities, data mining or analysis entities, game organizations, game development companies, etc.

Figure 6:
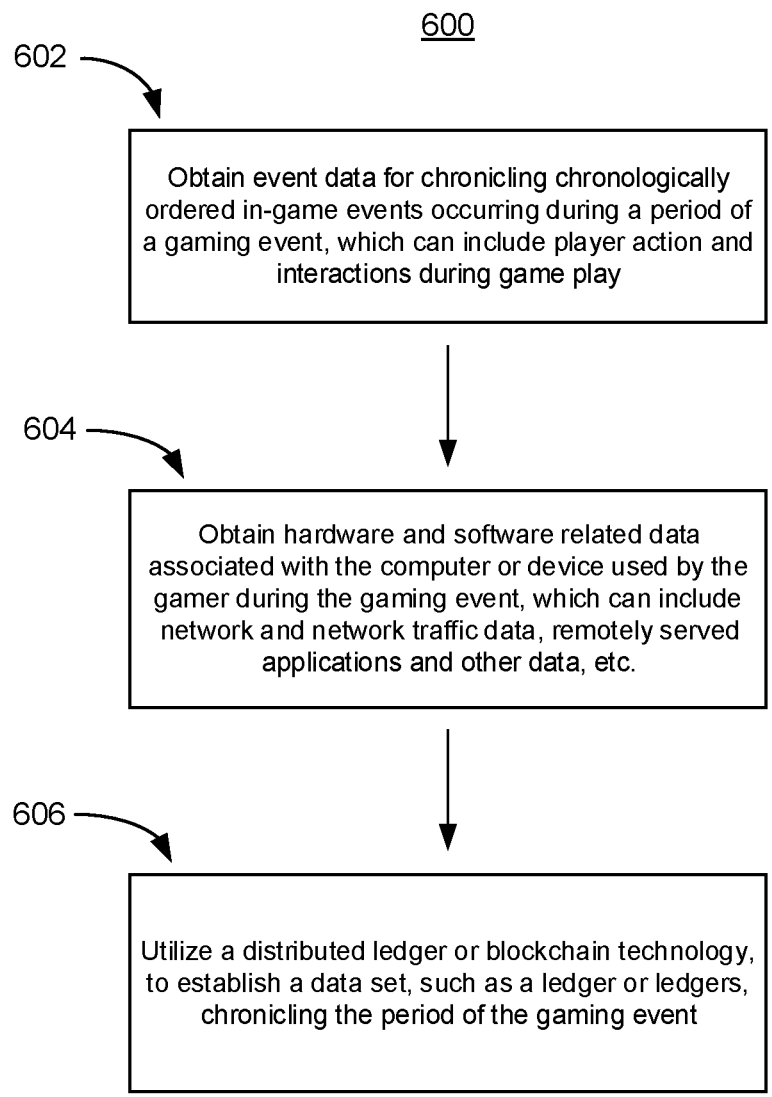
FIG. 6 illustrates a flow diagram of a method in accordance with an embodiment of the disclosed subject matter, including use of distributed ledger technology along with gaming associated data in establishing a data set chronicling a duration of a gaming event.

FIG. 6 illustrates a flow diagram of a method 600 in accordance with an embodiment of the disclosed subject matter. The method 600 includes use of a distributed ledger data structure along with gaming associated data in establishing a data set chronicling a duration of a gaming event. The gaming event includes at least one gamer engaging in gaming using a computer or computer-based device. Particularly, in method 600, step 602 includes obtaining event data for chronicling chronologically ordered in-game events occurring during at least a port of a duration of the gaming event, which can include player action and interactions during gameplay.

Next, step 604 includes obtaining hardware and software related data associated with the computer or computer-based device during the gaming event. The hardware and software related data can broadly include, for example, hardware and software executed on the computer or computer-based device, hardware and software of servers or other network components associated with serving of, for example, applications, games, programs or data to the computer or computer-based device (e.g., a client).

In connection with the obtained data, step 606 includes utilization of a ledger data structure (e.g., a distributed ledger or blockchain) to establish a data set, such as a ledger or ledgers, chronicling the duration of the gaming event.

Figure 7:
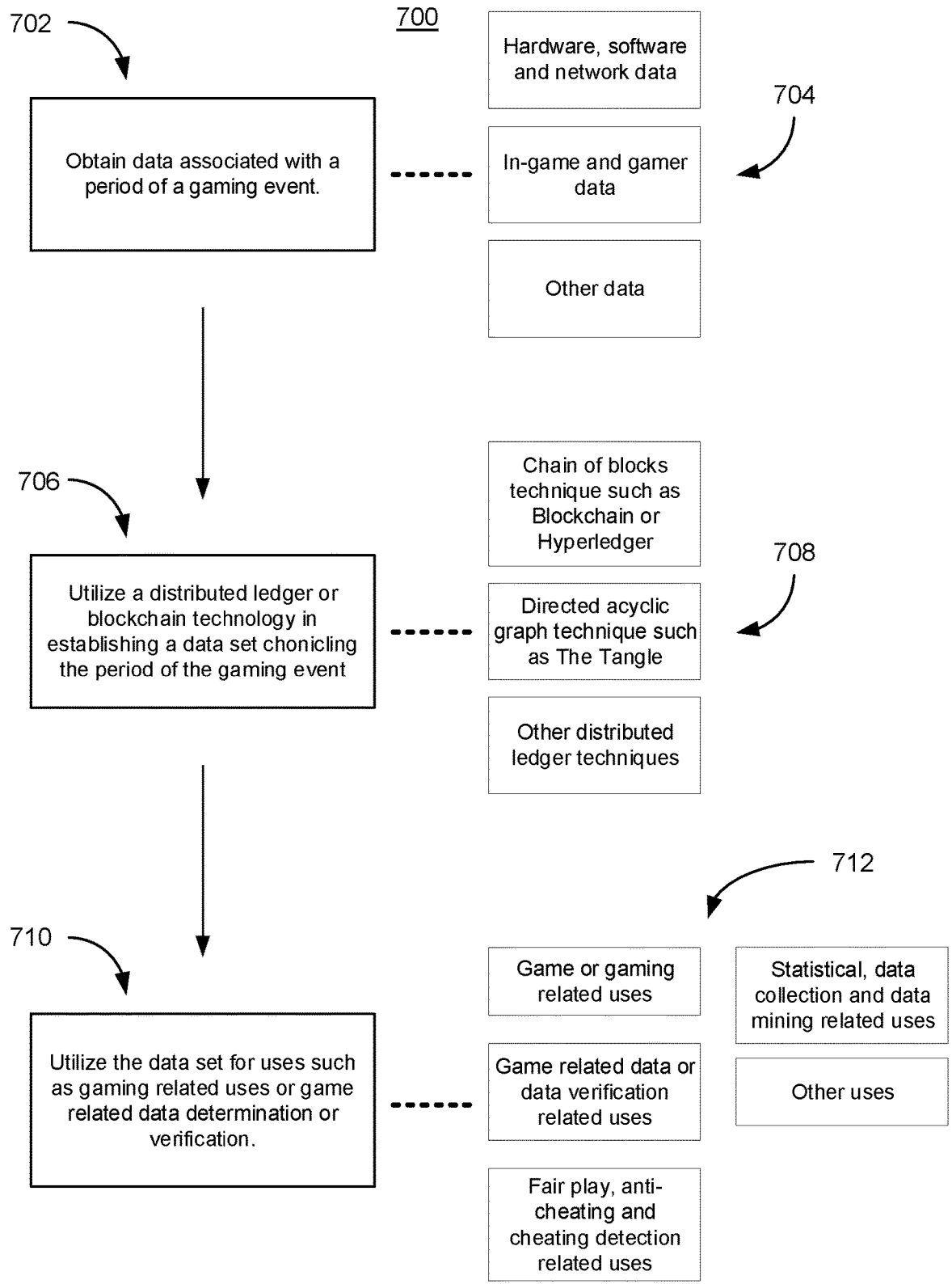
FIG. 7 illustrates a flow diagram of a method in accordance with an embodiment of the disclosed subject matter, including example aspects of the use of blockchain technology along with gaming associated data in establishing a data set chronicling a time duration of a gaming event.

FIG. 7 illustrates a flow diagram of a method 700 in accordance with an embodiment of the disclosed subject matter. Example aspects are illustrated of the use of a blockchain technique along with gaming associated data to establish a data set chronicling a duration of a gaming event or gaming session. Particularly, at step 702, data 704 associated with a duration of a gaming event is obtained. This can include, for example, hardware, software and network related data, such as of a gaming computer or device and potentially other networked devices such as servers, in-game and gamer related data, and other data.

Next, step 706 includes using a distributed ledger or blockchain technology to establish a data set chronicling the duration of the gaming event. Various distributed ledger technologies or types 708, or combinations of several technologies, are contemplated in various embodiments of the disclosed subject matter. In some embodiments, distributed ledger technologies or types 708 include technologies based on chains of blocks, such as blockchain or Hyperledger (see URL www.hyperledger.org). In some embodiments, distributed ledger technologies or types 708 include technologies based on directed acyclic graph (DAG) techniques, such as The IOTA Tangle (see URL www.iota.org). Furthermore, some embodiments use various distributed ledger technologies or associated technologies, such as a cryptocurrency related technique, a Bitcoin related technique, an Openchain technique, an open source technique, a hashgraph-utilizing technique, a hash chain-utilizing technique, or a Markov chain-utilizing technique, for example.

In some embodiments, certain disclosed ledger-based technologies can provide particular advantages. For example, directed acyclic graph (DAG) technologies can be used in comparing game play and performance between players where multiple gaming events can be represented as nodes in the graph and where each node can point to a subsequent node representing a new, linked event later in time. For example, nodes can represent goals or objectives in the game. Furthermore, in some cases, hashgraph technologies may have advantages in terms of recording gaming events, time stamping, and fast data transmission. Linear chains may have advantages with particular data structure embodiments where games have clear turns (e.g., chess, Go, turn-based strategy games, etc.), including uses of genesis blocks (e.g., genesis block 406) and terminal blocks (e.g., terminal block 407), as discussed above.

At step 710, the data set is used, for example, for uses 712 such as gaming related uses or game related data determination or verification uses; fair play, anti-cheating and cheating detection related uses; statistical, data collection and data mining related uses; and other uses.

Figure 8:
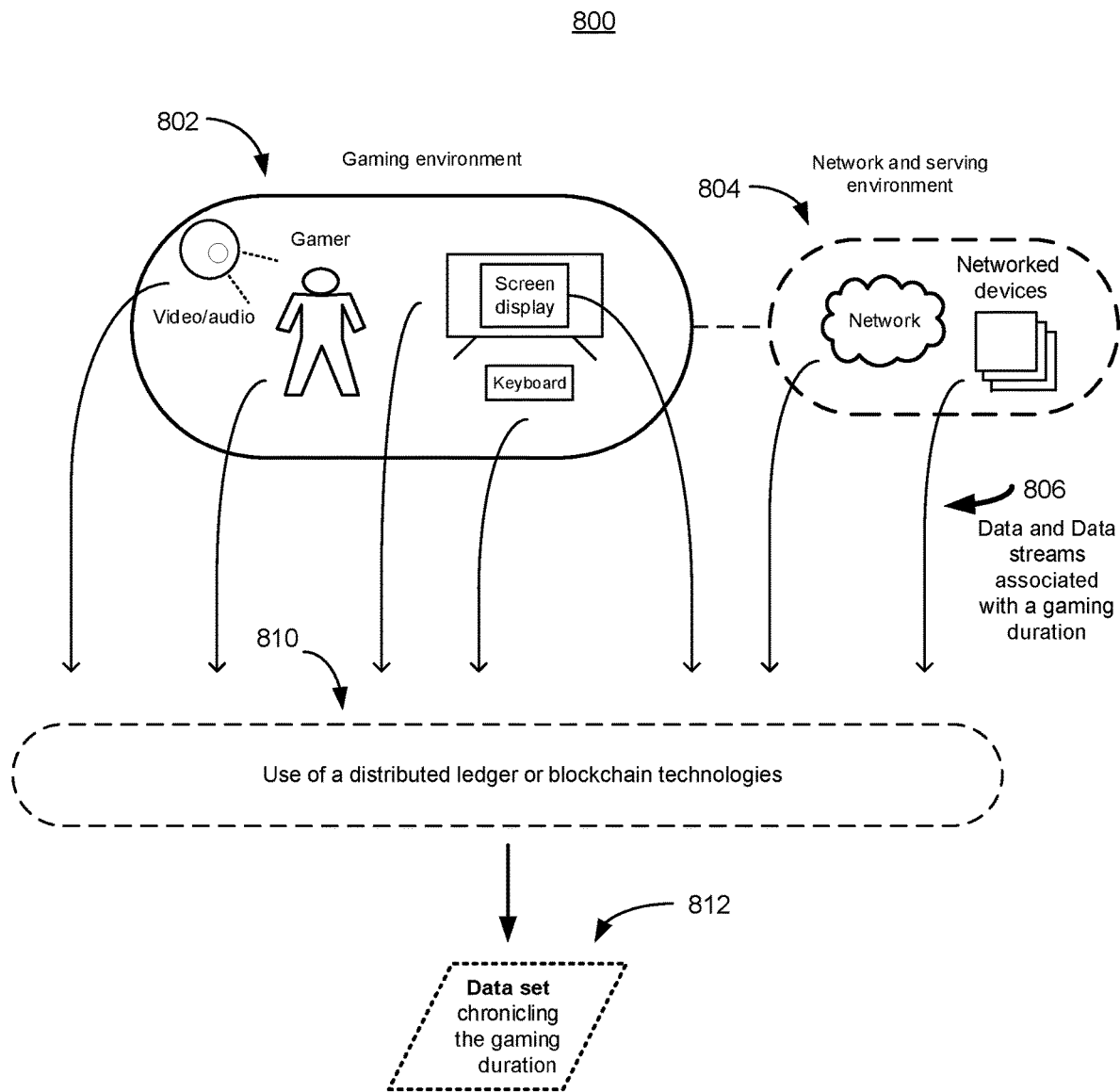
FIG. 8 illustrates a block diagram in accordance with an embodiment of the disclosed subject matter, including example types and particular of data streams for use with distributed ledger technology in establishing a data set chronicling a time duration of a gaming event.

FIG. 8 illustrates a block diagram 800 in accordance with an embodiment of the disclosed subject matter. Example types of data or data streams 806 associated with a gaming duration are illustrated. The data or data streams 806 can be for use with distributed ledger technology in establishing a data set chronicling a duration of a gaming event.

As conceptually depicted in FIG. 8, the data and data streams 806 include data and/or data streams 802 associated with a gaming environment and data and data streams 804 associated with a network and serving environment. The data and/or data streams 802 associated with the gaming environment can include, for example, data and/or data streams associated with the gaming computer or device such as hardware and software including applications. The data and/or data streams 802 associated with the gaming environment can further include gamer and game associated data, including gamer actions and interactions such as in-game and physically in connection with the gaming computer or device or peripherals. In some embodiments, gamer associated data can further include data obtained from sensors associated with the gamer, such as by being worn by the gamer or positioned in the environment or with the gaming computer or device and peripherals, for example. In-game data include any of various types and levels of detail of data regarding elements or aspects of the game itself, including graphical user interfaces, scenes, displays, game sequences, game characters, game scores, virtual elements, etc. The data and/or data streams 802 associated with the gaming environment can further include environmental data associated with the gaming computer or device or the gamer, such as, for example, camera, webcam as part of the gaming computer or device or otherwise, video and audio data of the area and including the gamer, the gaming computer or device and peripherals, the display screen and game sound, gamer eye tracking data, mouse or cursor tracking data, etc.

The data and/or data streams 804 associated with the network and serving environment can include, for example, data associated with the network itself, such as network identity, networks and subnetworks included within the network, network configuration and elements or aspects, network interfaces, network traffic including mapping to or interaction with the gaming, network components and elements, etc. In some embodiments, the network can include an Internet of Things network, and data can include data relating to the Internet of Things type network, including configuration, sensors, actuators, edge interfaces, edge devices, appliances, peripherals, robots, etc.

A ledger data structure 810 (e.g., distributed ledger, blockchain, etc.) can be used in connection with the data and/or data streams 802, 804 in establishing a data set 812 chronicling a duration the gaming event.

Some embodiments of the disclosed subject matter include utilization of ledger data structure technologies in the context of gaming, which, as mentioned above, is broadly intended to include, among other things, gambling, simulations, etc. Many gaming contexts are contemplated, including video games, sports, eSports games, arcade and arcade-style games, computer games and simulations, virtual reality games and simulations, mixed reality games, 3D games and simulations, enhanced reality games and simulations, electronic games, one-on-one, group or team competition games, shooting, shooter or shoot-out type games, sports type games, gambling, betting games, lottery type games, casino games, gaming machine games, AI-based entity games (e.g., one or more AI-based entities competing with other AI-based entities), multiplayer games such as Overwatch® or World of Warcraft®, battle royale games, non-computer based games such as physical games, etc.

Gaming related data regarding various aspects of the overall gaming environment and its physical, conceptual, electronic and virtual contents, including the gaming itself, can be comprehended and integrated, as well as data at various levels of specificity, depth, angles, and granularity.

The gaming related data can include static or partially static data, such as data that is unchanged for at least a portion of a gaming duration. The static or partially static data may include for example, hardware, software, and/or some network related data. The gaming related data can also include streaming data. Streaming data can include, for example, frequently changing, flowing, or regularly or constantly changing, dynamic type data. Data can be obtained in total, or in some embodiments, on a timed, periodic, or sampling basis, where the frequency of sampling can be steady or vary, such as depending on and in view of particular circumstances influencing the desired sampling timing. In various embodiments, any, a portion, or all of the particular gaming data or subgroups of data can be included in a chronicling data set (e.g., data set 812).

As detailed above, the gaming related data can broadly and generally include, for example, among other things, gamer associated data, including regarding the gamer's identity, actions and actions in-game, such as scoring, etc. The gaming related data can also include, for example, game associated data; in-game and in-game items, characters, entities, contents, displays, scenes, views, impressions, advertisements, developments, status, concepts and actions related data; data associated with leaderboards, displays or other elements of a gaming competition or eSporting or tournament event, time-stamping and time stamping data etc. The data can further include hardware and software data, including programs and applications, interfaces, configurations, layouts, devices, hardware components and subcomponents, brands or models of components, uniquely identified items or components, particular individual items, types of items, etc. The hardware and software data considered to be associated with the gaming computer or device can include not only hardware and software of, residing on, or executed by the gaming computer or device, but also, in embodiments in which a network and one or more serves are included, hardware and software related data on any element or aspect of the network or devices communicatively coupled to the network, including servers, associated with the gaming. In various embodiments, raw or unprocessed data may be obtained and used, or data may be processed, standardized, normalized, formatted, converted, limited, compressed, etc., before being used. In some embodiments, even data about obtained data or data collection strategy, fractal layering structure data, and other metadata, can form part of the gaming related data and included or accounted for in a chronicling data set.

Various types of tools and software may be used in obtaining, generating, deriving and/or collecting gaming related data. For example, in some embodiments, keylogging or other tools may be used in collecting detailed data relating to the gamer, gaming computer or device and peripherals, game and gaming. A tool or software implementing keylogging can record or log the keys struck on a keyboard. Furthermore, regarding network and networked elements related data, tools or software such as Wireshark may be used, such as in obtaining network traffic and other information, particularly as maps to, relates to, or is relevant to the gaming event.

In some embodiments, particular aspects or types of data may be obtained at various levels of detail, granularity, and conceptual angles. For example, regarding a computer, such as a gaming computer or server, data can be obtained regarding the computer as a whole and its peripherals. Data can also be obtained regarding each of various components of the computer, such as the CPU, memory, graphics cards, etc. In some embodiments, data can be obtained at even more granular levels, such as subcomponents and interfaces of any of the foregoing components, and subcomponents of the subcomponents, such as chips, cores, or couplings, etc. Data can also be obtained at different conceptual aspects or angles at particular levels, such as angles related to interfaces or component or subcomponent relationships, communications or relative or group configurations, responses of hardware components, etc. In some embodiments, the levels of detail and granularity can, for example, reflect or map to each higher level of granularity, providing what can be described as a fractal layering of data. In some embodiments, elements or components of a system can be instrumented for collection or processing of data such as gaming data, which can include, for example, physical or software interfaces, sensors, etc.

Fractal layering can also be utilized with and applied to data other than hardware related data, including, for example, in-game aspects of data. Fractal layering can apply to in-game data in various ways, including, for example, with regard to game themes, subthemes and subthemes of subthemes; in-game sequences, parts or modules and layers of sub-elements thereof; in-game character sets, character groups, concepts, virtual or enhanced reality object sets and objects, etc. Fractally layered data may have particular advantages in various uses after use of distributed ledger technology in establishing a data set chronicling a duration of a gaming event. For example, fractally layered data can enable more efficient or staged dive-down into particulars of interest, in being helpful in inferring additional configuration data regarding, or relationships between, layered items or aspects, and other uses.

Some embodiments allow or facilitate what can be or amount to an authenticated, validated or notarized gaming event, such as an eSporting event, casino game, etc. The authenticated record of the event can have many uses both during and after the event, as detailed above. Some embodiments effectively combine advantages of ledger data structure technologies, including aspects related to decentralization, such as high efficiency, security and assured authenticity and data accuracy and integrity, with advantages of what can be or effectively amount to a centralized entity, body or organization, as detailed above, such as a standards entity, authoritative entity, official gaming entity, game developer entity, game or gaming running, management, governing or enforcing entity, eSporting entity, eSporting league, government entity, official entity, authentication entity, entity for data or fact determination such as may include time stamping data, evidence or proof, certifying entity, validating entity, checker or anti-cheating entity, etc.

Various embodiments may or may not make use of various elements that may be specific to some cryptocurrency or financial distributed ledger or blockchain technologies, such as, for example, proof or work, proof of stake, private or public peer-related aspects or private or public blockchain etc. In some embodiments, a public aspect may be utilized, in which associated network or consensus aspects participation is open to the public, or may be partially private, private, or protected, such as limited to particular allowed, invited, or validating peers, etc. that may be limited to or by various potential groups, sets, organizations, credential or qualification groups, etc. In some embodiments, however, peer participation or consensus, or some aspects thereof, are not utilized. Furthermore, in some embodiments, technologies other than distributed ledger technologies are utilized.

As detailed above, in some embodiments, equipment such as cameras, video and audio recording devices, sensors, etc., may be utilized in obtaining gaming related data. The gaming related data can include image, video and audio data relating to the gaming environment, gamer, gaming computer or device, or other device such as scoreboard or leaderboard output or display, such as may include score or performance display, etc.

Some embodiments of the disclosed subject matter use or adapt technologies described in U.S. Patent Application Publication Number US20180082043A1, entitled, "Sample Tracking Via Sample Tracking Chains, Systems and Methods", which is hereby incorporated herein by reference in its entirety. For example, some embodiments may use or adapt public or private blockchain related technologies as described therein, such as in connection with uses including notarization and audit trail production related to gaming. For example, the techniques described in publication US20180082043 can be adapted by treating each gaming component (e.g., monitor, display, keyboard, mouse, etc.) as a sample. The characteristics or performance of each component can be measured and placed within a ledger data structure to characterize or validate the nature of component before, during, or after play.

Some embodiments of the disclosed subject matter use or adapt technologies described in U.S. Patent Application Publication Number US20180018590A1, entitled, "Distributed Machine Learning Systems, Apparatus, and Methods", which is hereby incorporated herein by reference in its entirety. For example, in some embodiments, machine learning technologies are utilized in connection with distributed ledger or blockchain technologies in applications involving gaming. In some embodiments, these may include aspects of technologies described in U.S. Patent Application Publication Number US20180018590A1, in connection with machine learning technologies. For example, in gaming events where there is hidden information (e.g., fog of war, line of sight considerations, etc.), it may be desirable to isolate data representing the hidden information. Instead of sending the hidden information over the network, which may be sniffed and thus unsecure, the results of an analysis of the hidden information (e.g., results of actions, simulation of the information, etc.) can be sent. As a result, the risk of hidden information being unfairly identified by on-lookers can be reduced or eliminated.

Some embodiments of the disclosed subject matter use or adapt technologies described in U.S. Patent Application Publication Number US20160072800A1, entitled, "Synthetic Genomic Variant-based Secure Transaction Devices, Systems and Methods", which is hereby incorporated herein by reference in its entirety, such as in connection with blockchain related technologies as applied to gaming. For example, players can be identified by such security devices (e.g., secure transaction devices). Further, the secured information within such devices can be used to aid in generating the genesis block for a gaming event. Thus, the player may be uniquely identified and be validated as a proper player.

Some embodiments of the disclosed subject matter use or adapt technologies described in U.S. Patent Application Publication Number US20150332283A1, entitled, "Healthcare Transaction Validation Via Blockchain Proof-of-work Systems and Methods", which is hereby incorporated herein by reference in its entirety, such as in connection with blockchain related technologies as applied to gaming. Although the disclosed subject matter focuses on tracking a gaming event, it is also contemplated that medical information about the player (e.g., heart rate, breath rate, galvanic skin response, blood pressure, sweat, pupil dilation, etc.) can also be stored on the ledger data structure. Further, such information can be further shunted to the player's personal historical healthcare blockchain as described in publication No. US20150332283.

Some embodiments of the disclosed subject matter use or adapt technologies described in U.S. Patent Number US9886625B2A1, entitled, "Activity Recognition Systems and Methods", which is hereby incorporated herein by reference in its entirety, such as in connection with identifying and detecting patterns in ledgers or blockchains in connection with gaming. For example, the movements of human players in a physical environment can be tracked to identify possible actions or activities. These activities can be recognized at a high level where the corresponding gaming data can be annotated with metadata associated with the recognized activity. Such an approach is considered advantageous for virtual reality games where players have a larger degree of motion or freedom. Still, in console or computer-based gaming where a player is sitting, the recognition technology is considered useful because player's posture or hand motions can be tracked. It is also contemplated that these recognition techniques can be applied to virtual characters or avatars within a virtual reality environment or augmented reality environment by analyzing a video stream associated with the game.

In some embodiments, the disclosed subject matter use or adapt technologies described in U.S. Patent Application Publication Number US20150341209A1, entitled, "Fabric-Based Virtual Air Gap Provisioning, Systems and Methods", which is hereby incorporated herein by reference in its entirety. As one example, for enhanced security, one or more peer computer(s) or device(s) (e.g., peers 402 shown in FIG. 4) can instantiate a network sub-fabric isolated by a virtual air gap and establish a data set chronicling a time duration of a gaming event within the isolated network sub-fabric. A network fabric or sub-fabric include a plurality of communicatively coupled computing nodes. For instance, one or more peer computer(s) or device(s) can include a network configuration device (e.g., a server, switch, router, network node) that instantiates a network sub-fabric within a network fabric according to a virtual air gap policy. The virtual air gap policy includes fabric isolation criteria that define the nature of the isolation with respect to attributes in a fabric configuration space (e.g., physical isolation, temporal isolation, data isolation, logical isolation, etc.). In some embodiments, the network configuration device can further configure the network sub-fabric with an internal routing policy according to the fabric isolation criteria.

The network sub-fabric instantiated based on the virtual air gap policy is isolated by a virtual air gap or halo from being exposed to external network nodes. The degree and form of isolation can be configured based on the virtual air gap policy (e.g., partially, substantially, or completely locked down). As an example, the sub-fabric can be substantially locked down such that the sub-fabric is allowed to communicate to external computing nodes only based on a heart-beat protocol. As another example, the sub-fabric can be completely locked down (e.g., due to top-secret requirements). As a result, the sub-fabric may be completely isolated and is not permitted to rejoin the main fabric. In some embodiments, the isolation of the sub-fabric may or may not be physical. For instance, the sub-fabric may be physically connected to the external computing nodes in the main fabric, but such connections may be inactive, powered down, mechanically decoupled, electrically decoupled, etc.

In some embodiments, after an isolated network sub-fabric is instantiated, one or more peer computer(s) or device(s) can establish a data set chronicling a game duration within the isolated network sub-fabric. The one or more peer computer(s) or device(s) can form at least a part of the isolated network sub-fabric. And a ledger data structure (e.g., genesis block 406 of a blockchain 405 in FIG. 4) can be used in establishing the data set as described above. As a result, the data set can be established within the isolated network sub-fabric. As described above, the data set can be established using a ledger data structure that is centralized, semi-centralized, or distributed. The isolated network sub-fabric can include one or more computing nodes for implementing such a ledger data structure, whether it is centralized, semi-centralized, or distributed. The isolated network sub-fabric can provide further enhancement of security and further reducing the risk that the data set may be tampered with or hacked by an unauthorized entity. In some embodiments, if the data set to-be-established includes critical or highly sensitive/confidential data (e.g., military data), the network sub-fabric can be completely locked down before the data set is completely established. In some embodiments, the air gap policy can define one or more ports of the network sub-fabric to be disabled. As such, the data set established within the isolated network sub-fabric cannot be accessed through the disabled ports.

In some embodiments, after establishing the data set chronicling a duration of a gaming event using the ledger data structure, the isolated network sub-fabric can rejoin the main fabric external to the sub-fabric based on the air gap policy. For instance, as described above, if the data set is established using a distributed ledger data structure, it is difficult or almost impractical to impermissibly alter the data blocks contained in the data structure. Thus, an isolated network sub-fabric may not be required anymore. As a result, the air gap policy can define a duration of time delay after which the network sub-fabric is no longer isolated from the remaining computer nodes of the main fabric. According to such an air gap policy, the network configuring device can rejoin the sub-fabric to the main fabric by, for example, activating or enabling communication ports that are previously disabled, powering or activating the computing nodes in the sub-fabric, etc. In some embodiments, the rejoining of the sub-fabric can be performed after a predetermined time delay or a particular time point after the data set is established using a ledger data structure.

Some embodiments provide new solutions to technical problems. For example, some embodiments address problems relating to effective and comprehensive capturing of gaming related data. Furthermore, some embodiments address problems relating to capturing of diverse types of such as game or gaming related data, gamer related data, network, hardware, software and environment data, etc. Some embodiments provide solutions to these problems, including collection and capturing of various such types of data using distributed ledger or blockchain technologies.

Furthermore, some embodiments provide solutions to problems relating to storage, retrieval, querying, utilization, application, or otherwise management of gaming related data. For example, some embodiments provide solutions to problems relating to how to document and later obtain particular information relating generally to gaming, including disparate, diverse, and integrated data about various aspects thereof. In some embodiments, the system provides notarization of aspects of gaming events, allowing, among other things, determination or proof of facts relating to gaming events. This can include, for example, proof of scores for particular users in particular games or gaming events, particular game or gaming related data, gamer related data, network, hardware, software and environment data, etc., such as, for example, by a centralized, standards, authentication, verification, notarization, or official data providing entity, body or organization, etc.

Some embodiments provide solutions to problems relating to gaming event data collection, storage and organization. For example, some embodiments provide a software-based or hardware-based gaming event data collection engine. The engine may obtain event data for chronicling ordered in-game events and obtaining hardware and software information, for example. This information can then be used in chronicling the event, and in particular information or fact determination, retrieval, proof, notarization, and many other uses as described herein.

Furthermore, some embodiments provide solutions to problems relating to gaming event chronicling itself. For example, some embodiments provide a software-based gaming event data collection engine. The engine may facilitate utilizing a blockchain or distributed ledger technique or technology for recording and storing gaming event data, as well as hardware and software data, for example. The resulting data set can be used, for example, in chronicling the event, and in particular information or fact determination, retrieval, proof, notarization, and many other uses as described herein.

An example scenario is provided in order to further illustrate the utility and value of the disclosed subject matter. The following discussion leverages an example that presents the disclosed subject matter within a concrete setting using selected specific features as described above. More specifically, the example focuses on an eSporting event where two teams are pitted against each other within one or more video game sessions associated with a specific game. One should appreciate that such an event can be part of a larger organized play event where many teams compete against each other. For example, the event can be part of a League of Legends™ World Championship. The players are co-located at an eSports arena, which leverages a closed gaming network. The closed gaming network is closed with respect to non-gaming devices. However, it is contemplated that a chronicling engine can have access to broadcast live content broadcast over social media or television.

For the sake of discussion, the eSporting event can be chronicled using a semi-centralized blockchain where a game server is also configured to operate as a chronicling engine. Thus, the game server can provide game data to each player and receive game data from each player over a network while also aggregating the data to form the gaming event blockchain that chronicles the entire gaming event. The blockchain can comprise multiple blocks starting with a genesis block that primes the ledger data structure, followed by one or more additional blocks, and finally terminated by a terminal block indicating the closure or end of the gaming event. Each block can include information that "points back" to or reference a previous block. Typically, a current block will be annotated with a hash token that is generated as a hash value from the data in the current block as well as the hash value of the previous block. Further, each block can be notarized by including a token from an external ledger, a current block hash from Bitcoin for example. The notarization token provides evidence of the credibility or integrity of the data at a specific time. This approach is akin to taking a photograph of a person holding a newspaper as a timestamp.

To begin, the chronicling engine (i.e., the game server in this scenario) generates a genesis block. The genesis block is an amalgam of gaming data that can be considered to represent the initial state of the gaming event or gaming session event. In more preferred embodiments, the genesis block includes verified or certified data. For this specific example scenario, the genesis block can include a compilation of hardware information representing data associated with the various pieces of hardware used during the game session event. For example, each computer can be queried or analyzed to obtain all relevant hardware information possibly including CPU, number of cores, network cards, graphics card, audio hardware, memory type, serial numbers, or other information related to the hardware. In addition to data associated with the gaming computers, the server and networking infrastructure hardware information can also be included in the genesis block. The purpose for such information is to ensure that all players have access to equivalent computer equipment where this information can be verified at a later date thereby ensure the players are all on a level playing field.

Further, the genesis block can also include related software information. Typically, the software information would include information related to the actual gaming software running on the game play computer or game sever. However, the software information can also include various ancillary data such as operating system version, driver versions, threading information, package checksums, or other aspects associated with executing instructions on a computing device. The advantage of such an approach is that each player device can be installed with identical software packages so that each device can be certified as being equivalent from a software perspective, at least to within a defined threshold. For example, the list of software packages installed on each device must be certified as being the same before a gaming event or gaming session event would take place. However, the serial number or license numbers would likely be different for each piece of software. Such a difference would be considered an acceptable threshold difference. Naturally, each serial number or license number can also be accompanied by a certification or notarization of validity from a corresponding vender.

In addition to software and hardware information, the genesis block can also include additional digital metadata related to the event. In this example case, the genesis block can include information about each player, the arena, event identifier (e.g., current round, current heat, etc.), session identifier, information related to the officiating persons (e.g., names, rank, title, certifications, identifier codes, security keys, etc.), sponsors, advertisers, time, weather information, or other data related to the event. Still further, the genesis block can also include blocks from other chronicling engines as discussed below.

In more preferred embodiments, the genesis block further includes a notarization code representing externally generated information from a trusted source. The notarization code is used to indicate that the data in the genesis block is indeed unaltered, untampered, or authentic data that exists at least at the point in time when the notarization code is generated. For example, the notarization code can include a token generated by external distributed ledger technology. A hash value of a current Bitcoin blockchain block can be used as such a notarization code. A Bitcoin block hash would be useful for generation of the genesis block due to Bitcoin's market presence and credibility. Other types of distributed ledger tokens can also be used.

The data within the genesis block can be structured as desired depending on the data. In some embodiments, the data can be stored according to desired mark-up language (e.g., JSON, YAML, XML, etc.). Further, the data can be organized as an N-tuple of attribute-value pairs where each attribute takes on one or more values, preferably according to a standardized taxonomy or ontology. Still further, the data can be compiled into a raw binary encoded data structure or compressed to reduce overall memory foot print.

The genesis block can be finalized in its final form by generating a hash value for the genesis block where the hash value is generated as a function of all data included in the block (e.g., hardware data, software data, metadata, notarization code, etc.). An acceptable hash function would preferably include one or more hash functions that operate quickly on large amounts of data, while also lacking substantial collisions. For the sake of this example, SHA-256 would be considered acceptable.

In view that the event's blockchain data should be secured from tampering, it is also contemplated that the genesis block can be encrypted according to one or more cryptographic functions (e.g., elliptic curve cryptography, AES, 3DES, etc.) based on one or more keys where the keys are managed by an authority. Such an authority can include the event organizer or league for example. Thus, only authorized entities have access to the records. To further ensure the data within the genesis block and the associated blockchain is secure and untampered, the blocks of the blockchain can be stored in a secured tangible, non-transitory computer readable memory. For example, the data can be stored on the gaming event server within a data store that has been certified as compliant against Federal Information Processing Standard (FIPS) 140-2. One example of a data store that can be installed on the gaming event server is a Seagate® Savvio® 15K self-encrypting hard drive that has been certified as FIPS 140-2 level 2 compliant. All secured types of memory are contemplated (e.g., flash drives, SANs, NASs, etc.). As another example of storing data securely and preventing the blockchain to be impermissibly tampered, a network sub-fabric isolated by a virtual air gap can be used to store the blocks of the blockchain. Depending on the air gap policy, the network sub-fabric can be partially, substantially, or completely locked down as described above, thereby preventing or reducing the possibility of unauthorized access and tampering.

Once the genesis block has been instantiated and stored, the gaming event is ready to begin. In this example scenario, the gaming event server stores a centralized blockchain. However, the example seeks to exemplify that the system can operate according to other configurations as well. As stated previously, the game event can leverage a semi-centralized blockchain. A semi-centralized blockchain can be considered to store blocks in a centralized manner, while each individual gaming computer can also store a local blockchain while forwarding blocks to the gaming server for incorporation into server's blockchain.

Each player's computer can also be instrumented with a local chronicling engine which also generates a local genesis block in a similar manner as described above with respect to the server's genesis block. The local genesis block can also include a notarization code and can also be encrypted possibly based on a local key and the server's public key as desired. Once established, the local genesis block can be sent to the server for incorporation in the server's genesis block or other block of the server's blockchain. Further, in some embodiments, each team can also have a team blockchain where the team's chronicling engine can be installed on one of the player's computer or can be a separate distinct computer from the player's computers or from the gaming server. Such an approach is considered advantageous because it permits each team to create their own secure log of events during an event.

As play begins in this example, each player's computer operating as a local chronicling engine receives digital gaming data stream via one or more gaming interfaces (e.g., joysticks, keyboards, network ports, cameras, audio, etc.) receiving the inputs provided by the player or players. Example inputs can include keystrokes, video data, audio data, joystick controller movement, mouse movements, clickstreams, or other form of game related sensed input. The local chronicling engine can identify one or more gaming session events related to the game in order to generate a new block of data. The gaming session event can have various levels of detail from low, atomic units of gaming data, such as a single keystroke, mouse clicks or timestamps; to high, abstract levels of detail. A high, abstract level of detail can include meeting an in-game objective, for example, capturing a locale or achieving a number of kills. The local chronicling engine generates or otherwise instantiates one or more gaming event data units representing the data structures in memory storing the related gaming session event. As discussed above, the gaming event data unit can be stored as attribute-value pairs, JSON data structures, or according to other schemas.

Upon satisfaction of a required criteria, the gaming event data units can be stored within the local blockchain or server's blockchain. One should appreciate that the generation of new blocks for the blockchain can also include incorporation of a notarization code as discussed above with respect to the genesis block. In more preferred embodiments, the notarization code during game play originates from an external trusted server or computer node capable of generating such codes quickly; possibly originating from Hashgraph for example. Hashgraph (see URL www.hashgraph.org) suggests they can support up to 50K transactions per second (assuming Hashgraph operates on 30 computers), which indicates a higher rate of generating block hashes than Bitcoin. As a result, during the game play, sources of notarization codes capable of generating such notarization codes quickly are more preferable than sources lacking the ability to generate codes quickly. The capability of generating notarization codes in a high rate can be desirable or beneficial because many games have a very rapid rate of acquiring game player input. Thus, the rate of new block generation can be quite high (e.g., 1 block a second, 10 blocks a second, 100 blocks a second, etc.). Further, a new block can include a hash value that is based on the block's data, the notarization code (if present), and the previous block's hash, thereby forming a robust chain of blocks. As with the genesis block, the new blocks can also be encrypted.

Block hashing can be performed using one or more hash algorithms. In embodiments where speed is required, a fast algorithm such as xxHash (a non-cryptographic hash) is likely be more desirable then slower cryptographic hashes (e.g., scrypt, SHA-512, etc.). A cryptographic hash algorithm such as SHA-256 is considered acceptable in many embodiments. Still, other embodiments can employ one or more hardware accelerators (e.g., FPGA, ASICs, GPUs, etc.) to increase the rate of hashing if needed to support block generation or reduce the computational impact of hashing on a player's computer while running the game.

The criteria for generation of a new block can vary depending on the nature of the game, players, or other event factors. In some games where the number of inputs per second are quite high (e.g., 100 keystrokes or mouse clicks per second), the criteria for generation of a new block may depend solely on the number of inputs rather than time; StarCraft® would be an example of a game that may require such criteria. Other games that are more strategic and have less input can leverage criteria that depends solely on elapsed time; for example, generate a new block every second. One should appreciate that other criteria (e.g., criteria depending on a combination of the number of inputs and the elapsed time) are also possible. In the current example, after a new block is generated, it can be sent to the game server for chronicling within the server's blockchain.

The server's chronicling engine can be configured to receive new blocks according to various schedules. In some embodiments where new blocks are generated at irregular times (e.g., based on fixed number of inputs, amount of player data generated, etc.), the schedule can be quite relaxed and likely not fixed. In other embodiments, where new blocks are generated at specific times, the server's chronicling engine can expect or anticipate the times for receiving blocks from each player's computer accordingly (e.g., a block every second). The player's computers can send all their blocks in a synchronized manner (e.g., at the same time, etc.), according a server side poll, according to a fixed round robin schedule, or according to other criteria. In cases where the various devices must maintain a high degree of time synchronization, the devices can coordinate time through various methods possibly including network time protocol, using GPS sensors, local time server, or other techniques. For example, GPS sensors offers the ability to synchronize clocks to about ±10 ns accuracy. As a result, time coordination using the GPS sensors provides very fine-grained fidelity for timestamping actions or inputs within the game. Such fine-grained timestamping can reduce timing conflicts among player actions when reviewing the game data at a later date. Further, the fine-grained timestamps provide for more detailed analysis of time-series data generated from the game, which aids in generation of AI training data sets.

As the server's chronicling engine aggregates the blocks, the chronicling engine can assemble the blocks in the server's own chain. The server's blockchain can be a chronological ordering of the received blocks as hashed with the server's previous blocks, or the server's blockchain can be a set of chains organized as threads as describe with respect to FIG. 2. For example, each thread can represent a player or a team. Thus, in the current example, if there are two teams, each with five players, then the server's blockchain can comprise at least 12 related threads; 10 dedicated to the data associated with the players and two dedicated to the data associated with the team.

Although the example thus far focuses on game play, and particularly on an eSporting game, one should appreciate that other types of games (e.g., physical games, a game having AI-based entities) and non-gaming event or session event data can also be incorporated into the ledger data structure for the gaming event. As described above, data associated with physical games can be obtained by using, for example, cameras, motion tracking devices, facial recognition devices, image processing applications, and/or other types of sensors. Such data can be incorporated into the ledger data structure as described above. Similarly, as described above, data associated with a game that is played by one or more AI-based entities can also be captured and incorporated into the ledger data structure.

As another example, each team or player can have multiple people associated with them to manage real-time social media content during game play. The social media content can include real-time commentary, tweets on Twitter®, FaceBook® posts, Twitch.TV feeds, Instagram® posts, chat room content, or other types of real-time content. In some embodiments, the server's chronicling engine can be configured to register one or more members of the entourage (e.g., managers, agents, attaches, friends, etc.) as valid content providers. The chronicling engine can then access or otherwise subscribe to various feeds and capture the content for incorporation into the gaming event blockchain, blockchains, threads, or other ledger data structures. Still further, in some variations, the registered social media content providers can install a sanctioned or certified application on their social media device where the application is specifically configured to provide content to the identified chronicling engine. Such an application can be provided by the gaming or certification authority, sponsor, or other entity responsible for the gaming event. The approach of chronicling game related social media content is considered advantageous because it provides for capturing external perspectives of the game play in real-time. Such perspectives can then be mined for types of game play that elicit specific responses from the audience, which could then be leveraged for advertising. For example, game play or posted social media content the indicates a large positive audience reaction can then be sold or auctioned to advertisers during a replay of the event or for future gaming events when such types of play are identified via digital signatures within the gaming data stream. Social media content can be incorporated directly into the server's chronicling engine, possibly as one or more chains, or can be stored as a separate dedicated chain.

The entire gaming event can be stored on the blockchain and can be archived for future use. Further, the blockchain or blockchains can be appended with a terminal block indicating the end of the recordation. The terminal block can also include a notarization code and optionally one or more signatures of officiating entities. In the current example, the chains can be analyzed post-game to validate the overall game play. An official, assuming proper authorization or after decryption, can access the one or more blockchains to validate the game play by feeding the blockchains through one or more validation tools. The validation tools comprise executable software instructions that cause a processor to examine or browse the blockchain looking for any anomalous behavior or events as chronicled. For example, the validation tools can compare actions taken by the players with known game exploits to identify cheating behavior if there are matching signatures. Further, the player actions can be compared to nominal behaviors that are considered acceptable within the logical, digital, or physical bounds of the game. If the actions exceed such bounds, then the actions can be flagged for further scrutiny because such actions seem to exceed what would be considered possible. Although these validation tools are contemplated to run post-game, it is also contemplated that such validation tools can run in parallel on the chronicling engine to annotate events with metadata that flag such in-game session event as possibly be anomalous. The annotations can be incorporated directly in the blockchains or stored separately. However, when running the validation software on the same computer as the gaming server, care should be taken to ensure the validation tools do not significantly impact game play.

Although the disclosed subject matter has been presented from the perspective of a single, multi-team arena event, other variants are naturally possible. In battle royale games were each player plays as an individual, each individual player may have their own blockchain. However, in view the battle royale game is hosted by a single server, it may be more preferable that the server operates as a single chronicling engine as it collects all actions in a centralized manner. This approach may be especially desirable when players are remote or distributed geographically instead of in a central arena.

The disclosed technologies described with respect to the above example can be further modified for gaming events that are less rigorous than a sectioned eSporting arena event. For example, gaming events can be established among players distributed remotely relative to each other and where each player has different gaming equipment. In such cases, each player can have a local chronicling agent that operates as a client of a remote server's chronicling engine. The local chronicling agent can, assuming proper permissions, query the player's equipment to create an inventory of hardware, software, metadata, networking infrastructure, metrics (e.g., ping times, lag, etc.) or other game related data. The local chronicling agent can send the data back to the server's chronicling engine for instantiation of the gaming sessions genesis block.

In view that the game can played on a heterogeneous mix of equipment and software among the remote player, the approach of compiling a remote blockchain having such information affords many opportunities. One specific opportunity is that leader board algorithms can be adjusted based on the information regarding each player's equipment or inventory status, which allows for leveling the playing field based on the nature of the equipment, network, or other player-specific information. For example, if a player suffers from a large network latency, but performs moderately well in the game, then his or her leader score can be up weighted. Thus, an aspect of the disclosed subject matter includes normalizing game information within a ledger data structure based on measured game attributes (e.g., latency, ping times, CPU clock speed, etc.).

Further, for amateur play or pro-am play, the blockchains can be validated to identify cheaters for feeder events. As discussed previously, the notarized blockchains can be analyzed post-game, or even during the game, to identify anomalous behavior signatures, possibly based on the techniques described in U.S. Pat. No. 9,716,723, entitled "Vector-Based Anomaly Detection" filed on Oct. 20, 2015.

As examples of detecting cheating in a game, the ledger data structure storing the data set chronicling the gaming events can be validated or verified based on known exploits of the game, based on rules or constrains associated with the game, based on comparison with data associated with other gamers, based on simulations, or the like. As one example, the data set stored in the blocks of the blockchain can be examined to detect any abnormal gaming behavior based on known exploits or glitches of the game. For instance, an abnormal gaming behavior associated with a Speedrun game may include skipping a large portion of a game level by abusing a collision glitch, so that the gamer can advance to the next level more quickly.

As another example, the data set stored in the blocks of the blockchain can be examined to detect any abnormal gaming behavior based on rules or constraints. For instance, a play envelope representing the rules or constraints may define that a permitted mouse resolution is in the range of 100 to 1000. However, if the hardware/software related data included in a block of the blockchain indicates that the mouse resolution has been impermissibly changed to a higher value (e.g., 10,000), such that the aiming using the mouse is much accurate, then an abnormal gaming behavior may have occurred.

As another example, the data set stored in the blocks of the blockchain can be examined to detect any abnormal gaming behavior based on comparison with data associated with other gamers. For instance, comparing of data associated with a particular gamer and other gamers may indicate that the particular gamer appears to be able to know or anticipate, for most of the time, the next correct move or the content of the game that is coming up. As another example, in a H1Z1 Battle Royale game, compared to other gamers, the particular gamer appears to be able to shoot a game character immediately after the character comes out behind a wall in a scene of the game. These comparison results may raise a red flag of abnormal behavior indicating, for example, the video stream of the game may have been hacked or impermissibly viewed before the game by the gamer.

As another example, for physical games (e.g., basketball, soccer, hockey, etc.), the ledger data structure (e.g., a blockchain) storing the data set chronicling a duration of a gaming event can be validated to identify any unpermitted or unauthorized tampering or altering of the data set. As described above, for example, using a data set stored in a blockchain or a distributed ledger data structure, a play envelop can be compared to video/image data frames representing a scoring event by a particular player. The comparison data can in turn be included in the data set implemented by the blockchain or distributed ledger data structure. Because the data set is stored in a distributed ledger data structure or a blockchain structure, unauthorized tampering or hacking of the video/image data frames can be greatly reduced or eliminated. For instance, it is impractical to alter every copy of the video/image data frames distributed in the blockchain; and/or the blocks storing the video/image data frames are validated, notarized, and verified by external blockchain tokens. As a result, using the distributed ledger data structure or blockchain structure, the comparison data, which may related to controversial or important gaming event, can represent authenticated, validated, or notarized data.

As another example, for games having AI-based entities (e.g., a chess game, a Go game), the ledger data structure (e.g., a blockchain) storing the data set chronicling the a duration of a gaming event can be validated to identify any abnormal (e.g., cheating) behavior during the game based on specification or simulation. Specifically, the gaming data included in a blockchain can be compared to specification of an AI algorithm and/or results of simulation. If the comparison indicates deviation from the specification or results of simulation, an abnormal behavior may have occurred. For instance, if an AI algorithm has been impermissibly altered or hacked, the AI-based entity may perform in a much superior manner in a game (e.g., much more accurate aiming, much more in-depth calculation of the movement steps, many more iterations in a specific time duration, etc.).

In some embodiments, analyzing the data in the blocks of a ledger data structure can be performed dynamically. As described above, data obtained by peer computer(s) or device(s) can be used to establish a data set chronicling a game duration using ledger data structures. In some embodiments, analysis of the data can be performed before the complete data set is established. For instance, as a blockchain is being established to add more blocks, previously established blocks can be analyzed to validate the data stored in the blocks. As a result, the system of establishing the data set and validating the data set can be a dynamic system. A dynamic system can be desired and beneficial. For example, some games may be fast-paced and thus produce large amounts of data in a short time duration. Some games may be played by many teams/players across different geographical regions, and thus producing large amounts of data. For these types of games, awaiting the complete data set to be established before validating or verifying data may not be desired or may even be impractical. Therefore, one or more peer computer(s) or device(s) can be programmed or configured to perform, at least partially in parallel, the establishment of the data set and the analysis of the data set. Further, the rate of establishing the data set and the rate of analyzing the data set can be configured or adapted dynamically based on the computing power/resource (e.g., bandwidth) that a particular peer computer or device may have at any time point.

In some embodiments, data analysis for validation, notarization, or verification of the blocks in a blockchain can be performed in a secured and deterministic manner. For instance, a heart-beat generator can be used to periodically generate secured and/or authorized time stamps. These time stamps can be incorporated into the blocks in a blockchain as part of the notarization process. In some embodiments, a lead-sanction notary can be performed using a lead server. Specifically, a lead server can be a computing node or device that generates deterministic hash values at a current time point. One or more of the hash values can be included into the block that is being established in a blockchain. As a result, a secured and notarized blockchain can be established using the secured/authorized time stamps or deterministic hash values.

Figure 9:
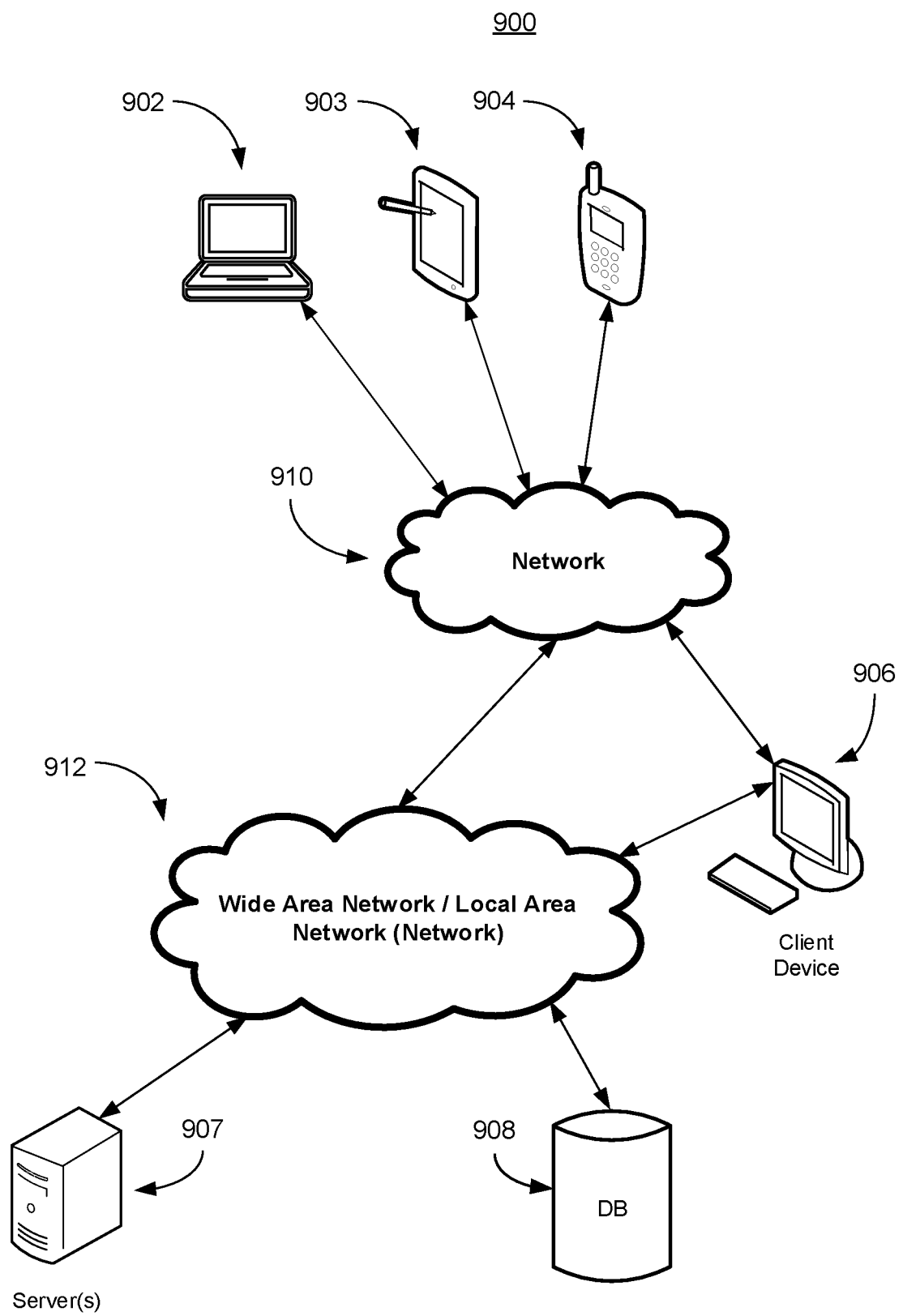
FIG. 9 illustrates a block diagram of a distributed computer system that can implement one or more aspects of a gaming data related system or method according to an embodiment of the disclosed subject matter.

FIG. 9 illustrates components of one embodiment of an environment in which the disclosed subject matter of this application may be practiced or implemented. Not all of the components may be required to practice or implement the disclosed subject matter, and variations in the arrangement and type of the components may be made without departing from the spirit or scope of the disclosed subject matter. As shown, the system 900 includes a network 910, which may broadly include one or more networks, such as cloud networks, wired or wireless networks, local area networks ("LANs")/wide area networks ("WANs"). The system 900 further includes one or more wired or wireless devices 902-906, such as may include or be physically, electrically, or communicatively coupled with one or more servers 907 and one or more databases 908. Various of the client devices 902-906 may include a wide array of types of devices, which may or may not be incorporated or associated with large or other devices, including, for example, desktop computers, laptop computers, set top boxes, tablets, cell phones, smart phones, batteries, vehicle batteries, power management devices, network management devices, monitoring devices, medical or health care related devices, video or audio devices, tracking devices, and many others. Each of the devices 902-906 may include various elements or components including wired or wireless interfaces, software or hardware instrumentation, etc. The client computer or device 906 may be, for example, a gaming computer or device. However, embodiments are contemplated in which a gaming computer or device is not a client, may not be connected to a network, or may not be associated with a server or servers. The servers 907 may be, for example, one or more peer computer(s) or devices.

Figure 10:
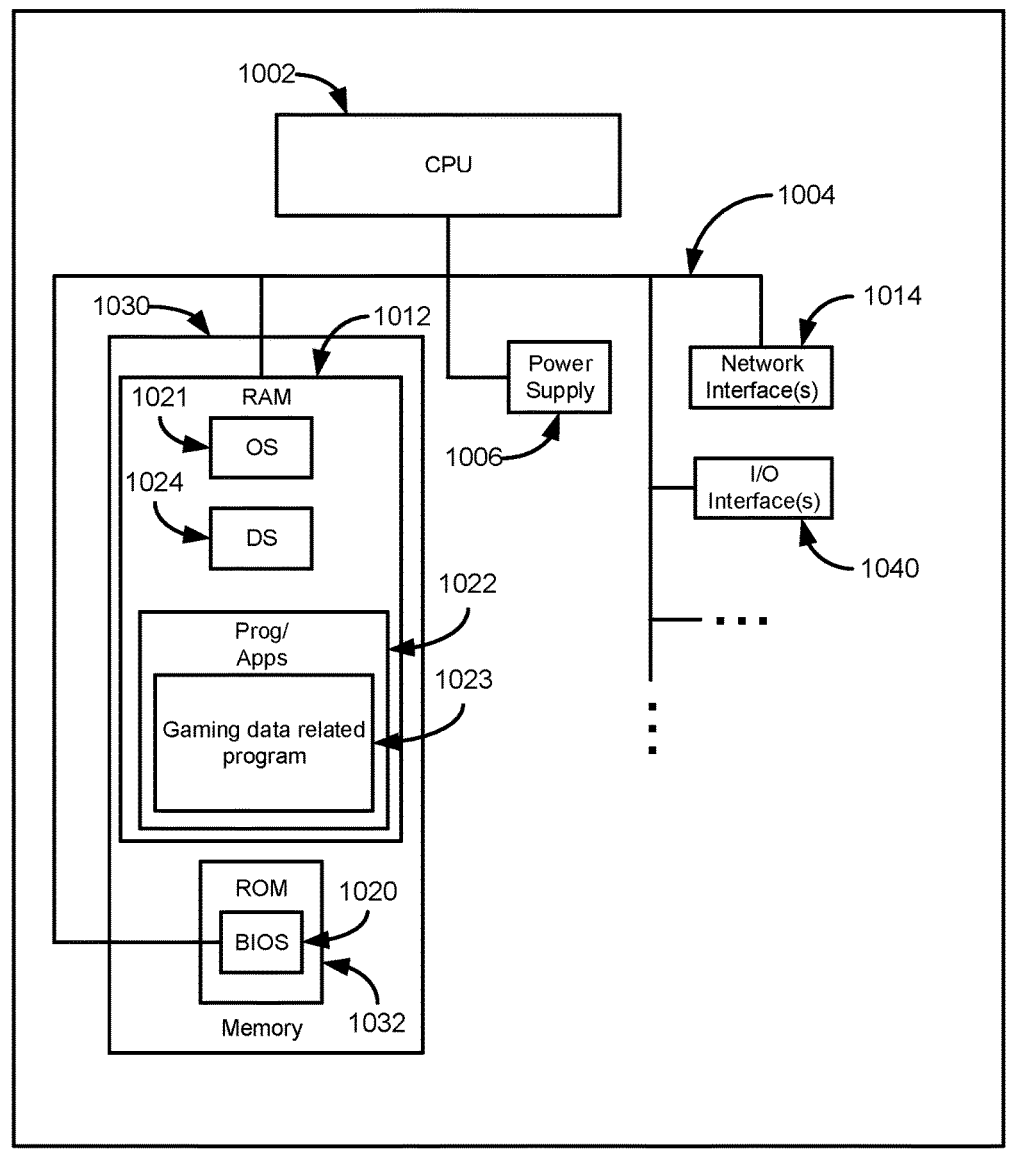
FIG. 10 illustrates a block diagram of an electronic device that can implement one or more aspects of a gaming data related system or method according to one embodiment of the disclosed subject matter.

FIG. 10 illustrates a block diagram of an electronic device 1000 that can implement one or more aspects of methods 1000 according to embodiments of the disclosed subject matter. Instances of the electronic device 1000 may include servers, e.g. servers 907-908, and devices, e.g. devices 902-906. In general, the electronic device 1000 can include a processor 1002, memory 1030, a power supply 1006, and input/output (I/O) components 1040, e.g., microphones, speakers, displays, touchscreens, keyboards, keypads, GPS components, etc., which may be operable, for example, to provide graphical user interfaces. The electronic device 1000 can also include a communications bus 1004 that connects the aforementioned elements of the electronic device 1000. Network interfaces 1014 can include a receiver and a transmitter (or transceiver), and an antenna for wireless communications.

The processor 1002 can include one or more of any type of processing device, e.g., a central processing unit (CPU). Also, for example, the processor can be central processing logic. Central processing logic, or other logic, may include hardware, firmware, software, or combinations thereof, to perform one or more functions or actions, or to cause one or more functions or actions from one or more other components. Also, based on a desired application or need, central processing logic, or other logic, may include, for example, a software controlled microprocessor, discrete logic, e.g., an application specific integrated circuit (ASIC), a programmable/programmed logic device, memory device containing instructions, etc., or combinatorial logic embodied in hardware. Furthermore, logic may also be fully embodied as software.

The memory 1030, which can include RAM 1012 and ROM 1032, can be enabled by one or more of any type of memory device, e.g., a primary (directly accessible by the CPU) or secondary (indirectly accessible by the CPU) storage device (e.g., flash memory, magnetic disk, optical disk). The RAM can include an operating system 1021, data storage 1024, which may include one or more databases, and programs or applications 1022, which can include, for example, software aspects of the gaming data related program 1023. The ROM 1032 can also include BIOS 1020 of the electronic device.

The gaming data related program 1023 is intended to broadly include or represent all programming, applications, algorithms, software and other tools necessary to implement or facilitate methods and systems according to embodiments of the inventive subject matter, which may include elements of a network management engine, such as network management engine 102. The elements of the gaming data related program 1023, or of a network management engine, may exist on a single server computer or be distributed among multiple computers, devices or entities.

The power supply 1006 contains one or more power components and facilitates supply and management of power to the electronic device 1000.

The input/output components, including I/O interfaces 1040, can include, for example, any interfaces for facilitating communication between any components of the electronic device 1000, components of external devices (e.g., components of other devices of the network or system 900), and end users. For example, such components can include a network card that may be an integration of a receiver, a transmitter, and one or more input/output interfaces. A network card, for example, can facilitate wired or wireless communication with other devices of a network. In cases of wireless communication, an antenna can facilitate such communication. Also, some of the input/output interfaces 1040 and the bus 1004 can facilitate communication between components of the electronic device 1000, and in an example, can ease processing performed by the processor 1002. In some embodiments, the device 1000 may include or be coupled to network management device instrumentation, such as network management related device instrumentation 110.

Where the electronic device 1000 is a server, it can include a computing device that can be capable of sending or receiving signals, e.g., via a wired or wireless network, or may be capable of processing or storing signals, e.g., in memory as physical memory states. The server may be an application server that includes a configuration to provide one or more applications via a network to another device. Also, an application server may, for example, host a Web site that can provide a user interface for administration of example aspects of a gaming data related program 1023.

Any device capable of sending, receiving, and processing data over a wired or a wireless network may act as a server, such as in facilitating aspects of implementations of the gaming data related program 1023. Thus, devices acting as a server may include devices such as dedicated rack-mounted servers, desktop computers, laptop computers, set top boxes, integrated devices combining one or more of the preceding devices, other devices, etc.

Servers may vary in widely in configuration and capabilities, but they generally include one or more central processing units, memory, mass data storage, a power supply, wired or wireless network interfaces, input/output interfaces, and an operating system such as Windows Server, Mac OS X, Unix, Linux, FreeBSD, etc.

A server may include, for example, a device that is configured, or includes a configuration, to provide data or content via one or more networks to another device, such as in facilitating aspects of an example gaming data related program 1023. One or more servers may, for example, be used in hosting a Web site.

Servers may also, for example, provide a variety of services, such as Web services, third-party services, audio services, video services, email services, instant messaging (IM) services, SMS services, MMS services, FTP services, voice or IP (VOIP) services, calendaring services, phone services, advertising services etc., all of which may work in conjunction with example aspects of an example gaming data related program 1023. Content may include, for example, text, images, audio, video, advertisements, etc.

In example aspects of the devices executing the gaming data related program 1023, devices may include, for example, any device capable of sending and receiving data over a wired or a wireless network. Such devices may include desktop computers as well as portable devices such as cellular telephones, smart phones, display pagers, radio frequency (RF) devices, infrared (IR) devices, handheld computers, tablets, GPS-enabled devices tablet computers, sensor-equipped devices, laptop computers, set top boxes, monitoring devices, medically related devices, consumer related devices, tracking devices, battery or power management devices, and many others. Devices may range widely in terms of capabilities and features. For example, a cell phone, smart phone or tablet may have a numeric keypad and a few lines of monochrome LCD display on which only text may be displayed. In another example, a Web-enabled client device may have a physical or virtual keyboard, data storage (such as flash memory or SD cards), accelerometers, gyroscopes, GPS or other location-aware capability, and a 2D or 3D touch-sensitive color screen on which both text and graphics may be displayed.

Devices, such as client devices 902-906 shown in FIG. 9, for example, may run a variety of operating systems, including personal computer operating systems such as Windows, iOS or Linux, and mobile operating systems such as iOS, Android, and Windows Mobile, etc. Client devices may be used to run one or more applications that are configured to send or receive data from another computing device. Client applications may provide and receive textual content, multimedia information, etc. Client applications may perform actions such as browsing webpages, using a web search engine, sending and receiving messages via email, SMS, or MMS, playing games (such as fantasy sports leagues), receiving advertising, watching locally stored or streamed video, or participating in social networks.

In example aspects of the network environment associated with the gaming data related program 1023, one or more networks, such as network 910 shown in FIG. 9, for example, may couple, such as via interfaces or instrumentation, servers and devices with other computing devices, including through wireless network to client devices. A network may be enabled to employ any form of computer readable media for communicating information from one electronic device to another. A network may include the Internet in addition to local area networks (LANs), HDMI, wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling data to be sent from one to another.

Communication links within LANs may include twisted wire pair or coaxial cable, while communication links between networks may utilize analog telephone lines, cable lines, optical lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and a telephone link.

A wireless network, such as network 910, as in an example gaming data related program 1023, may couple devices with a network. A wireless network may employ stand-alone ad-hoc networks, mesh networks, Wireless LAN (WLAN) networks, cellular networks, etc.

A wireless network may further include an autonomous system of terminals, gateways, routers, or the like connected by wireless radio links, or the like. These connectors may be configured to move freely and randomly and organize themselves arbitrarily, such that the topology of wireless network may change rapidly. A wireless network may further employ a plurality of access technologies including $2^{nd}$ (2G), $3^{rd}$ (3G), $4^{th}$ (4G), and $5^{th}$ (5G) generation, Long Term Evolution (LTE) radio access for cellular systems, WLAN, Wireless Router (WR) mesh, etc. Access technologies such as 2G, 2.5G, 3G, 4G, 5G and future access networks may enable wide area coverage for client devices, such as client devices with various degrees of mobility. For example, wireless network may enable a radio connection through a radio network access technology such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, 802.11ad, 802.11ay, etc. A wireless network may include virtually any wireless communication mechanism by which information may travel between client devices and another computing device, network, etc.

Internet Protocol may be used for transmitting data communication packets over a network of participating digital communication networks, and may include protocols such as TCP/IP, UDP, DECnet, NetBEUI, IPX, Appletalk, and the like. Versions of the Internet Protocol include IPv4 and IPv6. The Internet includes local area networks (LANs), wide area networks (WANs), wireless networks, and long-haul public networks that may allow packets to be communicated between the local area networks. The packets may be transmitted between nodes in the network to sites each of which has a unique local network address. A data communication packet may be sent through the Internet from a user site via an access node connected to the Internet. The packet may be forwarded through the network nodes to any target site connected to the network provided that the site address of the target site is included in a header of the packet. Each packet communicated over the Internet may be routed via a path determined by gateways and servers that switch the packet according to the target address and the availability of a network path to connect to the target site.

A "content delivery network" or "content distribution network" (CDN), as may be used in connection with an example gaming data related program 1023, generally refers to a distributed computer system that comprises a collection of autonomous computers linked by a network or networks, together with the software, systems, protocols and technologies designed to facilitate various services, such as the storage, caching, or transmission of content, streaming media and applications on behalf of content providers. Such services may make use of ancillary technologies including, but not limited to, "cloud computing," distributed storage, DNS request handling, provisioning, data monitoring and reporting, content targeting, personalization, and business intelligence. A CDN may also enable an entity to operate or manage a third party's Web site infrastructure, in whole or in part, on the third party's behalf.

A peer-to-peer (or P2P) computer network relies primarily on the computing power and bandwidth of the participants in the network rather than concentrating it in a given set of dedicated servers. P2P networks are typically used for connecting nodes via largely ad hoc connections. A pure peer-to-peer network does not have a notion of clients or servers, but only equal peer nodes that simultaneously function as both "clients" and "servers" to the other nodes on the network.

The various embodiments are described with reference to the accompanying drawings, which form a part hereof, and which show, by way of illustration, specific examples of practicing the embodiments. This specification may, however, be embodied in many different forms and should not be construed as limited to the embodiments set forth herein; rather, these embodiments are provided so that this specification will be thorough and complete, and will fully convey the scope of the inventive subject matter to those skilled in the art. Among other things, this specification may be embodied as methods or devices. Accordingly, any of the various embodiments herein may take the form of an entirely hardware embodiment, an entirely software embodiment or an embodiment combining software and hardware aspects. The following specification is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the inventive subject matter may be readily combined, without departing from the scope or spirit of the inventive subject matter.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" includes plural references. The meaning of "in" includes "in" and "on."

It is noted that description is not intended as an extensive overview, and as such, concepts may be simplified in the interests of clarity and brevity.

The specification is to be understood as being in every respect illustrative and exemplary, but not restrictive, and the scope of the inventive subject matter disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the inventive subject matter. Those skilled in the art could implement various other feature combinations without departing from the scope and spirit of the inventive subject matter.

What is claimed is:

1. A computer readable, non-transitory memory (CRM) product suite having software instructions that cause at least one processor to execute the following operations:
   obtaining game state data from a gaming device, wherein the game state data is associated with a gaming event;
   updating a ledger data structure with the game state data;
   generating a data set from the ledger data structure and including at least a portion of the game state data in the data set;
   identifying an anomalous game behavior upon matching the data set with an anomalous behavior signature; and
   sending a notification including the anomalous game behavior.

2. The CRM product suite of claim 1, wherein the game state data comprises initial state data.

3. The CRM product suite of claim 2, wherein the operation of updating the ledger data structure includes generating a genesis block for the ledger data structure from the initial state data.

4. The CRM product suite of claim 2, wherein the initial state data comprises at least one of the following: a hardware state and a memory state.

5. The CRM product suite of claim 2, wherein the initial state data comprises at least one of the following types of information: player information, team information, server information, game software information, a network latency, a network packet loss, a list of software running on the gaming device, checksum information, at least one device state, a time stamp, and an external hash value.

6. The CRM product suite of claim 1, wherein the gaming device comprises at least one of the following computer-based devices: a smart phone, a tablet, a desktop computer, a set top box, a tablet, a vehicle, a gaming console, a smart watch, an appliance, and a television.

7. The CRM product suite of claim 1, wherein the ledger data structure comprises at least one distributed ledger.

8. The CRM product suite of claim 7, wherein the at least one distributed ledger comprises an Ethereum ledger.

9. The CRM product suite of claim 1, wherein the ledger data structure comprises at least one smart contract data structure.

10. The CRM product suite of claim 1, wherein the ledger data structure comprises at least one decentralized ledger.

11. The CRM product suite of claim 1, wherein the ledger data structure comprises at least one semi-centralized ledger.

12. The CRM product suite of claim 1, wherein the operations further include notarizing the game state data.

13. The CRM product suite of claim 12, wherein the operation of notarizing the game state data comprises incorporating a notarization code with the game state data when updating the ledger data structure.

14. The CRM product suite of claim 13, wherein the notarization code comprises at least one of the following types of codes: a code from a trusted server, a hashgraph code, and an external ledger hash.

15. The CRM product suite of claim 1, wherein the data set comprises one or more blocks of data from the ledger data structure.

16. The CRM product suite of claim 1, wherein the data set comprises a chronicle of at least a portion of the gaming event.

17. The CRM product suite of claim 1, wherein the identified anomalous game behavior comprises a cheating behavior.

18. The CRM product suite of claim 1, wherein the identified anomalous game behavior comprises an abnormal behavior.

19. The CRM product suite of claim 1, wherein the anomalous behavior signature comprises at least one of the following signatures: a known game exploit, exceeding a nominal boundary, a vector-based anomaly, a simulation signature, a game constraint, and a game glitch.

20. The CRM product suite of claim 1, wherein the gaming event includes at least one of the following game events: a tournament, an eSports event, a gambling event, a board game event, and a video game event.

* * * * *